US010298549B2

(12) United States Patent
Lee et al.

(10) Patent No.: US 10,298,549 B2
(45) Date of Patent: May 21, 2019

(54) STATELESS ACCESS STRATUM SECURITY FOR CELLULAR INTERNET OF THINGS

(71) Applicant: QUALCOMM Incorporated, San Diego, CA (US)

(72) Inventors: Soo Bum Lee, San Diego, CA (US); Anand Palanigounder, San Diego, CA (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 15/199,924

(22) Filed: Jun. 30, 2016

(65) Prior Publication Data

US 2017/0187691 A1    Jun. 29, 2017

Related U.S. Application Data

(60) Provisional application No. 62/387,499, filed on Dec. 23, 2015.

(51) Int. Cl.
*H04L 29/06* (2006.01)
*H04L 29/08* (2006.01)
(Continued)

(52) U.S. Cl.
CPC ........ *H04L 63/0428* (2013.01); *H04L 9/0822* (2013.01); *H04L 9/14* (2013.01);
(Continued)

(58) Field of Classification Search
CPC ... H04L 63/04; H04L 63/0428; H04L 63/123; H04L 63/16; H04L 63/205; H04L 9/0822; H04L 9/14; H04W 4/70
See application file for complete search history.

(56) References Cited

U.S. PATENT DOCUMENTS 8,019,083 B2   9/2011   Huang et al.
8,660,270 B2 *  2/2014   Blom ............... H04L 63/062
                                                                 380/278
(Continued)

FOREIGN PATENT DOCUMENTS

EP        2530963 A1    12/2012
WO   WO-2015015714 A1    2/2015

OTHER PUBLICATIONS

"3rd Generation Partnership Project; Technical Specification Group Services and System Aspects; Study on Security Aspects of Machine-Type Communications (MTC) and other mobile data applications communications enhancements (Release 12)", 3GPP Standard; 3GPP TR 33.868, 3rd Generation Partnership Project (3GPP), Mobile Competence Centre, 650, Route Des Lucioles, F-06921 Sophia-Antipolis Cedex, France, vol. SA WG3, No. V12.1.0, Jun. 26, 2014, XP050774355, pp. 1-116.

(Continued)

*Primary Examiner* — Khalil Naghdali
*Assistant Examiner* — Shaqueal D Wade
(74) *Attorney, Agent, or Firm* — Loza & Loza

(57) ABSTRACT

Aspects of security schemes (e.g., integrity protection, encryption, or both) are described. A measure of access stratum security can be realized without overhead associated with establishing and/or maintaining the per-cellular-device access stratum security context at a Cellular Internet of Things (CIoT) base station (C-BS). A gateway (e.g., a CIoT Serving Gateway Node (C-SGN)) may derive a first key. The first key may be only known to the C-SGN. The C-SGN may derive a second key from the first key and a parameter unique to the C-BS. The C-SGN may also derive a third key from the second key and an identity of a cellular device. The C-SGN may send the second and third keys to the C-BS and cellular device, respectively. Small data messages encrypted and/or integrity protected by the cellular device may be decrypted and/or verified by the C-BS.

26 Claims, 15 Drawing Sheets

(51) Int. Cl.
| | |
|---|---|
| *H04W 88/16* | (2009.01) |
| *H04L 12/24* | (2006.01) |
| *H04L 9/08* | (2006.01) |
| *H04L 9/14* | (2006.01) |
| *H04W 4/70* | (2018.01) |
| *H04W 12/04* | (2009.01) |
| *H04W 12/10* | (2009.01) |

(52) U.S. Cl.
CPC ............ *H04L 41/08* (2013.01); *H04L 63/062* (2013.01); *H04L 63/123* (2013.01); *H04L 63/16* (2013.01); *H04L 63/205* (2013.01); *H04L 67/12* (2013.01); *H04W 4/70* (2018.02); *H04W 12/04* (2013.01); *H04W 12/10* (2013.01); *H04W 88/16* (2013.01); *G06F 2221/2151* (2013.01); *H04L 63/1458* (2013.01); *Y04S 40/18* (2018.05)

(56) References Cited

U.S. PATENT DOCUMENTS

| | | | |
|---|---|---|---|
| 8,769,283 B2 | 7/2014 | Liu et al. | |
| 8,769,611 B2* | 7/2014 | Narayanan | H04L 63/06 726/2 |
| 8,850,554 B2 | 9/2014 | Otranen et al. | |
| 8,949,602 B2 | 2/2015 | Lee et al. | |
| 8,977,852 B2* | 3/2015 | Naslund | H04W 12/10 380/270 |
| 2013/0024701 A1* | 1/2013 | Hwang | H04L 9/0643 713/189 |
| 2015/0319172 A1* | 11/2015 | Zhang | H04L 63/065 713/169 |
| 2016/0182477 A1* | 6/2016 | Zhang | H04W 4/70 726/7 |
| 2018/0109941 A1* | 4/2018 | Jain | H04W 4/70 |

OTHER PUBLICATIONS

NEC: "Clarifications on Support of S5 Interface with C-SGN", 3GPP Draft; S2-152722, 3rd Generation Partnership Project (3GPP), Mobile Competence Centre, 650, Route Des Lucioles, F-06921 Sophia-Antipolis Cedex, France, vol. SA WG2, no. Sophia Antipolis, France, 20150831-20150903, Aug. 6, 2015, XP050990075, Retrieved from the Internet: URL: http://www.3gpp.org/ftp/tsg sa/WG2_Arch/TSGS2_110AH_Sophia/Docs/.

Partial International Search Report and Written Opinion—PCT/US2016/066702—ISA/EPO—dated Mar. 28, 2017.

Samsung: "Security Aspects of Connectionless Data Transmission", 3GPP Draft; S3130853—Key Handling Connectionless, 3rd Generation Partnership Project (3GPP), Mobile Competence Centre, 650, Route Des Lucioles, F-06921 Sophia-Antipolis Cedex, France, vol. SA WG3, no. Qingdao, 20130708-20130712, Jul. 12, 2013 (Jul. 12, 2013), XP050727215, Retrieved from the Internet: URL: http://www.3gpp.org/ftp/tsg_sa/WG3_Security/TSGS3_72_Qingdao/Docs/.

International Search Report and Written Opinion—PCT/US2016/066702—ISA/EPO—dated Jul. 12, 2017.

Qualcomm Incorporated: "Efficient Small Data Transmission With S1-based Architecture", 3GPP Draft, S2-152259, Jul. 6, 2015, XP050986709, Retrieved from the Internet: URL:http://www.3gpp.org/ftp/Meetings_3GPP_SYNC/SA2/Docs/ [retrieved on Jul. 7, 2015], 11 pages.

* cited by examiner

STATELESS ACCESS STRATUM SECURITY FOR CELLULAR INTERNET OF THINGS

This application claims priority to U.S. Provisional Patent Application No. 62/387,499, filed Dec. 23, 2015, titled Stateless Access Stratum Security For Cellular Internet Of Things, the contents of which is incorporated by reference herein in its entirety.

INTRODUCTION

Aspects of the present disclosure relate generally to wireless communication and more particularly, but not exclusively, to techniques to achieve access stratum security in a stateless manner for Cellular Internet of Things (CIoT) messages.

The International Telecommunications Union (ITU) describes the Internet of Things (IoT) as an infrastructure that connects physical and virtual things based on interoperable information and communication technologies. As used herein, and in the context of the IoT, a "thing" is an object in the physical world (e.g., a physical thing) or the information world (e.g., a virtual thing) that is capable of being identified and integrated into communication networks. Recommendation ITU-T Y.2060. Wireless communication networks such as wireless wide-area networks (WWAN) and/or wireless local-area networks (wireless LAN) are among the information and communications technologies interoperable with IoT devices.

According to a Long Term Evolution (LTE) paradigm, there are two modes defined for the radio connection: a connected mode; and an idle mode. In the connected mode, a cellular device is sending and receiving data. A User Equipment (UE) Context ("UE Context") or "Radio Resource Control (RRC) Connection" is established in the connected mode. For the UE Context, a radio bearer is established to relay the data between the cellular device and core network (e.g., an evolved packet core (EPC)). The radio bearer, referred to as an Evolved Radio Access Bearer (eRAB), includes a Radio Bearer portion and an S1 Bearer portion. The Radio Bearer is established between the cellular device and an evolved Node B (eNodeB) over an LTE-Uu reference point. The S1 Bearer is established between the eNodeB and a Serving Gateway (S-GW) over an S1 reference point. A security context is established to secure the communications.

In the idle mode, the eRAB bearer (Radio Bearer and S1 Bearer) is released and the security context is dropped. In this way, unnecessary radio resources are released. Radio bearers and security contexts are established and maintained only when there is data to be sent/received (i.e., in a connected mode). When the cellular device wakes up (e.g., from an idle mode), the eNodeB establishes a new UE Context and security context via a Service Request to a mobility management entity (MME) and enters the connected mode. When the cellular device becomes idle, the eNodeB removes the UE Context (e.g., eRAB Bearer) and security context and enters the idle mode.

LTE mobility management and session management procedures may incur substantial overhead for a Cellular Internet of Things (CIoT) device and the network supporting the CIoT device in terms of, for example, energy consumption as the signaling delay for establishing a UE Context would extend the CIoT device wakeup period. The overhead bears on added latency, which is also undesirable.

To reduce overhead and latency, different requirements for mobility management and security functions of CIoT, in comparison to requirements for other communications passing through a cellular device, have been proposed. These different requirements may reduce overhead related to mobility management and security functions of IoT devices operating in a cellular network. However, the different requirements may leave a radio access network (RAN) node and core network nodes open to undesirable vulnerabilities, such as, for example, denial of service (DoS) and/or packet flooding attacks. It is desirable, therefore, to find ways to overcome or prevent these undesirable vulnerabilities without increasing overhead and latency.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some implementations, a method of communication may include deriving, at a gateway, a first key that may be only known to the gateway. The gateway may also derive a second key that may be based on the first key and a parameter that may be unique to a node of a radio access network (RAN). The gateway may send the second key to the node of the RAN. The gateway may also derive a third key. The third key may be based on the second key and a parameter that may be unique to a cellular device. The gateway may then send the third key to the cellular device.

In some implementations, a communication apparatus may include a communication interface that may communicate with nodes of a communication network and a processing circuit that may be coupled to the communication interface. The processing circuit may be constructed, adapted, and/or configured to derive a first key that may be only known to the communication apparatus. The processing circuit may also derive a second key that may be based on the first key and a parameter that may be unique to node of a radio access network (RAN). The processing circuit may cause the communication apparatus to send the second key to the node of the RAN. The processing circuit may also derive a third key, which may be based on the second key and a parameter unique to a cellular device. The processing circuit may cause the communication apparatus to send the third key to the cellular device.

In some implementations, a method of integrity protected communication may include receiving, at a radio access network (RAN) node, a second key. The second key may be based on a first key and a parameter unique to the RAN node. The method may also include receiving, at the RAN node, a small data message including a device identity and a first integrity protection value (e.g., a value ascribed to a message authentication code (MAC) or a token). The RAN node may derive a third key that may be based on a second key and the device identity. The RAN node may then derive a second integrity protection value using the third key. A comparison of the first integrity protection value to the second integrity protection value may be conducted. If a result of the comparison indicates that the first and second integrity protection values are not equal, the RAN node may discard the small data message. However, if the result of the comparison indicates that the first and second integrity protection values are equal, the RAN node may send the small data message to a gateway.

In some implementations, a method of stateless access stratum security may be practiced. The method may include receiving a second key at a radio access network (RAN) node. The second key may be based on a first key and a parameter unique to the RAN node. The RAN node may receive an encrypted small data message that includes a device identity. The small data message may be encrypted with a third key. The RAN node may derive the third key, which may be based on the second key and the device identity. The RAN node may then decrypt the small data message using the third key.

In some implementations, another method of stateless access stratum security may be practiced. The method may include receiving a second key at a radio access network (RAN) node. The second key may be based on a first key and a parameter unique to the RAN node. The RAN node may receive a small data message including a device identity. The small data message may be encrypted using a third key and the small data message may include an integrity protection value, where integrity protection was implemented using the third key. The RAN node may derive the third key, which may be based on the second key and the device identity. The small data message may be decrypted at the RAN node using the third key. Additionally, the integrity protection value may be verified at the RAN node using the third key.

In some implementations, a method of on-demand integrity protection may be provided. The method may include, monitoring, by a radio access network (RAN) node, a traffic load value. The RAN node may detect that the traffic load value exceeds a predetermined threshold value. The RAN node, in response to detecting that the traffic load value exceeds the predetermined threshold value, may send a message to a cellular device. The message may request the cellular device to include a token in a next one or more messages sent to the RAN node.

In some implementations, an apparatus, such as a communication apparatus, may include a communication interface to communicate with nodes of a communication network and a processing circuit coupled to the communication interface. The apparatus may be used for integrity protected communication. In some implementations, the processing circuit may be constructed, adapted, and/or configured to receive a second key. The second key may be based on a first key and a parameter unique to the apparatus. The processing circuit may also receive a small data message including a device identity and a first integrity protection value. The processing circuit may derive a third key that may be based on a second key and the device identity. The processing circuit may then derive a second integrity protection value using the third key. A comparison of the first integrity protection value to the second integrity protection value may be conducted at the processing circuit. If a result of the comparison indicates that the first and second integrity protection values are not equal, the processing circuit may cause the apparatus to discard the small data message. However, if the result of the comparison indicates that the first and second integrity protection values are equal, the processing circuit may cause the apparatus to send the small data message to a gateway.

In some implementations, an apparatus, such as a communication apparatus, may include a communication interface to communicate with nodes of a communication network and a processing circuit coupled to the communication interface. The apparatus may be used to practice stateless access stratum security. In some implementations, the processing circuit may be constructed, adapted, and/or configured to receive a second key. The second key may be based on a first key and a parameter unique to the apparatus. The processing circuit may also receive an encrypted small data message including a device identity. In some implementations, the small data message may be encrypted with a third key. The processing circuit may derive the third key. The third key may be based on the second key and the device identity. The processing circuit may then decrypt the small data message using the third key.

In some implementations, an apparatus, such as a communication apparatus, may include a communication interface to communicate with nodes of a communication network and a processing circuit coupled to the communication interface. The apparatus may also be used to practice stateless access stratum security. In some implementations, the processing circuit may be constructed, adapted, and/or configured to receive a second key. The second key may be based on a first key and a parameter unique to the apparatus. The processing circuit may also receive a small data message including a device identity. The small data message may be encrypted with a third key and the small data message may include an integrity protection value derived using the third key. The processing circuit may derive the third key, which may be based on the second key and the device identity. The processing circuit may decrypt the small data message using the third key. The processing circuit may also verify the integrity protection value using the third key.

In some implementations, an apparatus, such as a communication apparatus, may include a communication interface to communicate with nodes of a communication network and a processing circuit coupled to the communication interface. The apparatus may be used for on demand integrity protected communication. In some implementations, the processing circuit may be constructed, adapted, and/or configured to monitor a traffic load value. The processing circuit may detect that the traffic load value exceeds a predetermined threshold value. The processing circuit may then cause the apparatus to send a message to a cellular device that requests the cellular device to include a token in a next one or more messages sent to the apparatus, in response to detecting that the traffic load value exceeds the predetermined threshold value.

In some implementations, a method of communication may include receiving, at a cellular device, a third key. The third key may be based on a second key and an identity of the cellular device, and the second key may be based on a first key and a radio access network (RAN) node identity. The method may further include configuring and/or negotiating a security protocol during an initial attach procedure. The security protocol may determine whether the cellular device may send small data messages without security, with integrity protection, with encryption, with integrity protection and encryption, and/or with on-demand integrity protection. In some implementations, the integrity protection and encryption may be based on the third key.

In some implementations, an apparatus, such as a communication apparatus, may include a communication interface to communicate with nodes of a communication network and a processing circuit coupled to the communication interface. In some implementations, the processing circuit may be constructed, adapted, and/or configured to receive a third key. The third key may be based on a second key and an identity of the apparatus. The second key may be based on a first key and a radio access network (RAN) node identity. The processing circuit may be further constructed, adapted, and/or configured to configure and/or negotiate a security protocol during an initial attach procedure. In some implementations, the security protocol may determine whether the apparatus sends small data messages without security, with integrity protection, with encryption, with integrity protection and encryption, and/or with on-demand integrity protection, in some implementations, the integrity protection and encryption may be based on the third key.

In some implementations, an apparatus, such as a communication apparatus, may include a communication interface to communicate with nodes of a communication network and a processing circuit coupled to the communication interface. The apparatus may also be used to practice stateless access stratum security. In some implementations, the processing circuit may be constructed, adapted, and/or configured to obtain a third key that is based on a second key and a parameter unique to the apparatus, negotiate an access stratum security configuration, protect a small data message based on the access stratum security configuration using the third key, and send the small data message protected using the third key. In some implementations, processing circuit may be further adapted to negotiate the access stratum security configuration with a RAN node, and send the small data message protected using the third key to the RAN node. In some implementations, processing circuit may be further adapted to obtain the third key from a gateway, wherein the second key is based on a first key and a parameter unique to a RAN node, and the first key is only known to the gateway. In some aspects, the processing circuit may be further adapted to negotiate the access stratum security configuration during an initial attach procedure. In some aspects, the processing circuit may be further adapted to negotiate an access stratum security configuration during an initial attach procedure with a device, wherein the access stratum security configuration specifies whether small data messages are sent from the device without security, with integrity protection, with encryption, with integrity protection and encryption, and/or with on-demand integrity protection, wherein integrity protection and encryption are performed using the third key.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
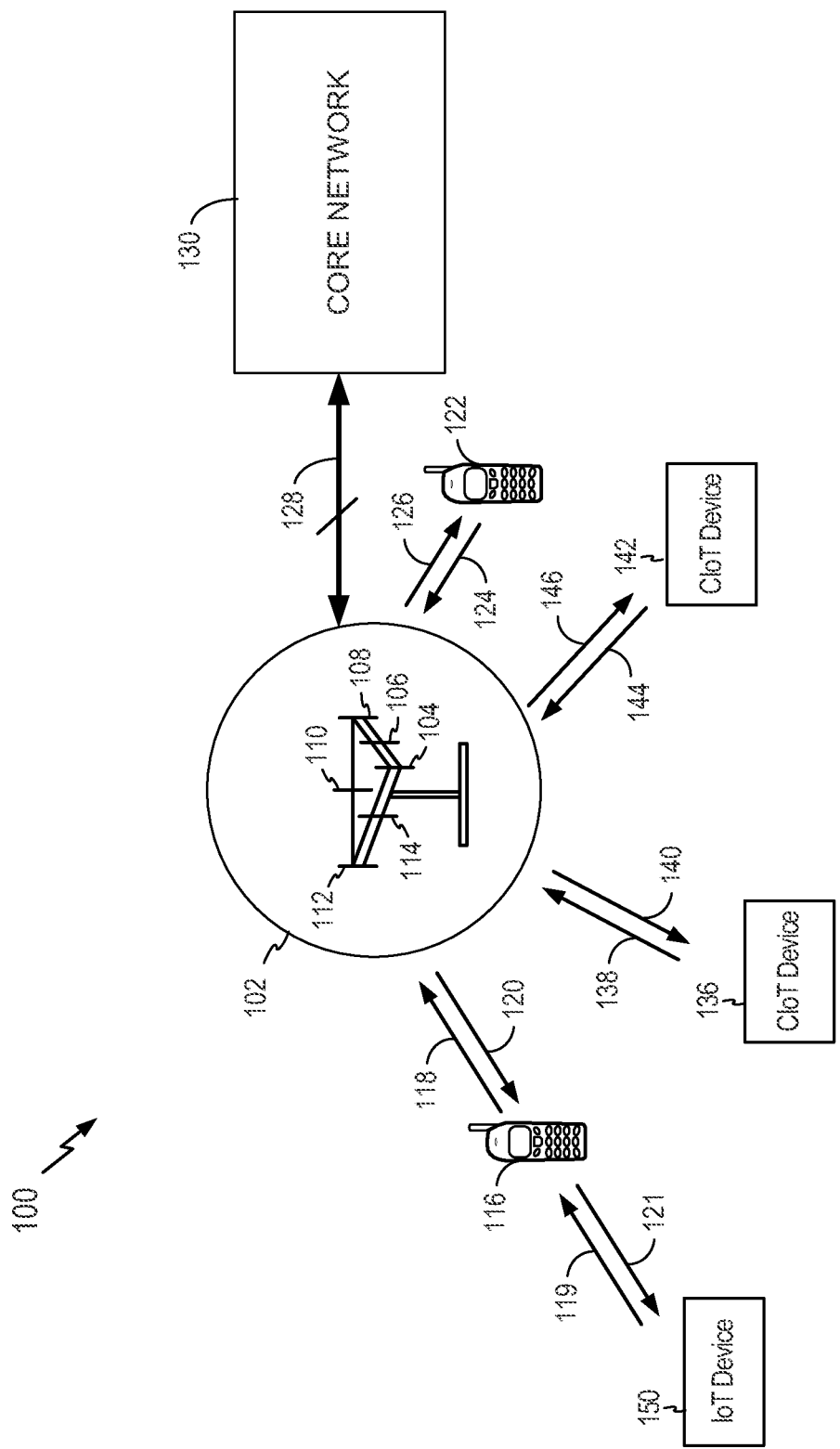
FIG. 1 is a diagram illustrating an example of a communication network within which aspects of the disclosure may find application.

IoT devices may include, but are not limited to, any piece of equipment with capabilities of communication and the optional capabilities of sensing, actuation, data capture, data storage, and/or data processing. A cellular device (e.g., a chip component, a wireless device, a mobile device, a user equipment (UE), a terminal) may interface with an IoT device. An interface may be achieved directly (e.g., the IoT device may be integral to the cellular device) or indirectly (e.g., the IoT device may interface to the cellular device via a local area network such as Bluetooth). For ease of reference, it will be understood that any reference to a cellular device made herein is a reference to a cellular device interfaced to an IoT device (i.e., a CIoT device), unless otherwise specified.

As used herein, the word "obtain" may mean derive, generate, compute, retrieve, receive, request, etc., and may encompass obtaining locally and/or obtaining remotely. As used herein, the word "obtain" may encompass partially obtaining and/or completely obtaining.

As used herein, the phrase "on-the-fly" may describe an action that may occur dynamically, or on an as-needed basis.

Overview

When a UE transitions from an idle mode to a connected mode, the UE and network supporting the UE traditionally establish a UE security context (e.g., a percellular-device access stratum (AS) security context) and an eRAB bearer. However, for Cellular Internet of Things (CIoT) devices (e.g., UEs interfaced with IoT devices), to reduce overhead, parties are proposing to eliminate establishment of the access stratum (AS) security context and eliminate mobility management. Elimination of mobility management (e.g., eliminate an MME) necessitates a change in network architecture. Accordingly, CIoT architecture introduces a new node referred to as a CIoT Serving Gateway Node (C-SGN). The C-SGN combines any needed functionality remaining from an MME with the functionality of a Serving-Gateway (S-GW).

However, eliminating access stratum (AS) security and mobility management for CIoT devices may leave a radio access network (RAN) node (e.g., an eNB) and core network nodes open to undesirable vulnerabilities such as denial of service (DoS) and/or packet flooding attacks.

The disclosure relates in some aspects to security schemes (e.g., integrity protection, encryption, or both) that can be achieved without establishing and/or maintaining a per-cellular-device access stratum (AS) security context at a RAN node such as at a Cellular Internet of Things (CIoT) base station (C-BS). At least some measure of access stratum security can be realized without overhead associated with establishing and/or maintaining the per-cellular-device access stratum security context.

A gateway, for example, a C-SGN, may obtain three keys. The first key may not be derived from any other key and the first key may be only known to the C-SGN. The first key, for example, can be randomly generated by the C-SGN. The second key may be based on (e.g., derived using, generated using) the first key and a parameter unique to a radio access network (RAN) node (e.g., an identity of an eNB or of a C-BS). The third key may be based on the second key and an identity of a cellular device. The identity may be, for example, an SAE-Temporary Mobile Subscriber Identity (S-TMSI).

The C-SGN may provision (e.g., provide, send, deliver) the second key to the RAN node and the third key to the cellular device. The third key may be provisioned, for example, to the cellular device over a secure NAS message.

When the cellular device sends a CIoT message (referred to as a "small data message"), the cellular device may add integrity protection and/or encryption to the CIoT message. The integrity protection and/or encryption may be performed using the third key. As stated, the third key may be based on (e.g., derived using, generated using) the second key and the identity of the device. The cellular device sends the integrity protected and/or encrypted CIoT message (e.g., the small data message) to the RAN node.

In some implementations, the RAN node may not establish and/or maintain an access stratum (AS) security context with the device (e.g., a UE security context). Establishing and/or maintaining an access stratum security context requires the use of state tables and the processing of data associated with the state tables; this overhead is not desirable. In some implementations, a RAN node may configure a device to enable/disable an access stratum security configuration (e.g., ciphering or integrity protection) for a CIoT message using RRC signaling. The access stratum security configuration may also be referred to as an access stratum security protection configuration. The access stratum security configuration may be triggered by the RAN node or by a C-SGN upon a triggering event. A triggering event may include, for example, detection of a bogus (e.g., false, counterfeit, not genuine) packet injection or detection of an attack such as a denial of service attack.

When access stratum security, as described in the examples presented herein, is triggered or used, the RAN node may use the second key (that was provisioned to the RAN node by the C-SGN) and the identity of the cellular device to obtain (e.g., derive, generate) a duplicate of the third key, on-the-fly. The identity of the cellular device is included with every small data message obtained at the RAN node and the second key is independent of the identity of the cellular device; accordingly, the security scheme is stateless in that a state table is not needed. Using the third key, the RAN node can verify, decrypt, or both, the small data based on a configuration. In one aspect, the RAN node may receive a small data message protected (integrity protected and/or encrypted) by the third key and may then verify the integrity protection of the small data message (i.e., to verify that the small data message was sent from the device that obtained the third key from the C-SGN) and/or decrypt the small data message.

Exempary Operating Environment

FIG. 1 is a diagram illustrating an example of a communication network 100 within which aspects of the disclosure may find application. A radio access network (RAN) may include one or more network access nodes (e.g., Cellular Internet of Things (CIoT) base station (C-BS), eNodeB) (referred to as a RAN node 102). Techniques presented herein may be used to provision keys to a RAN node 102 (e.g., a C-BS, an eNodeB), a cellular device 116, 122, and/or a CIoT device 136, 142. The keys (e.g., cryptographic keys, mathematically derived keys) may be used to integrity protect and/or encrypt small data messages. Integrity protection and/or encryption of small data messages desirably adds access stratum security and protection to the communication network 100.

In the example of FIG. 1, a RAN node 102 may include multiple antenna groups, one group including antennas 104 and 106, another group including antennas 108 and 110, and an additional group including antennas 112 and 114. In FIG. 1, two antennas are shown for each antenna group; however, more or fewer antennas may be utilized for each antenna group. A cellular device 116 may be in communication with the antennas 112 and 114 where the antennas 112 and 114 transmit information to the cellular device 116 over a forward link 120 (e.g., downlink) and receive information from the cellular device 116 over a reverse link 118 (e.g., uplink). A cellular device 122 may be in communication with the antennas 104 and 106, where the antennas 104 and 106 transmit information to the cellular device 122 over a forward link 126 and receive information from the cellular device 122 over a reverse link 124. The RAN node 102 may also be in communication with other cellular devices, which may, for example, interface with Internet of Things (IoT) devices. For example, an IoT device 150 may be in communication with the cellular device 116, wherein information may be transmitted to the IoT device 150 over a forward link 121 and information may be sent from the IoT device 150 to the cellular device 116 over a reverse link 119. A cellular device interfaced (e.g., directly or indirectly) to an IoT device (collectively referred to as a Cellular Internet of Things (CIoT) device 136 or CIoT device 136) may be in communication with one or more other antennas of the RAN node 102, where the antennas transmit information to the CIoT device 136 over a forward link 140 and receive information from the CIoT device 136 over a reverse link 138. A CIoT device 142 may be in communication with one or more other antennas of the RAN node 102, where the antennas transmit information to the CIoT device 142 over a forward link 146 and receive information from the CIoT device 142 over a reverse link 144. The RAN node 102 may be coupled to a core network 130 by one or more communication links and/or reference points 128.

The various concepts presented throughout this disclosure may be implemented across a broad variety of telecommunication systems, network architectures, and communication standards. For example, the Third Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Evolution of the LTE network is an ongoing process. The evolution includes changes/modifications/alternatives made for improved interoperability with all cellular devices, including cellular devices interfaced to IoT devices. Accordingly, examples of changes/modifications/alteratives to devices 116, 122, 150, 136, 142, the RAN node 102 and nodes within the core network 130 are described herein.

Wireless cellular communication networks address security at two levels. These levels are referred to as the access stratum (AS) and the non-access stratum (NAS). Using Long Term Evolution (LTE) as an example, an access stratum may be described as a functional layer in the wireless telecommunication protocol stacks between the RAN and a cellular device. The access stratum protocol layer may be responsible for transporting data over the wireless connection between the RAN and the cellular device and for managing radio resources. The non-access stratum may be a functional layer in the wireless telecommunication protocol stacks between the core network and cellular device. The non-access stratum protocol layer may be used to manage the establishment of communication sessions and for maintaining continuous communications with a cellular device as it moves. The non-access stratum protocol layer may also be used for passage of messages between the cellular device and a node of the core network (e.g., MME or C-SGN), where the messages are passed transparently through the RAN. Examples of NAS messages include Update messages, Attach Request messages, Attach Accept messages, Authentication messages, and Service Requests.

To reduce overhead and latency, the 3GPP standard setting body has proposed different requirements for CIoT, in comparison to the requirements for other communications passing through a cellular device. However, these requirements may leave a RAN node and core network open to undesirable vulnerabilities.

Among the different requirements is the elimination of access stratum security, Access stratum security relates to security in the air interface between the cellular device and the eNodeB. CIoT messages are proposed to be sent in the NAS layer, in the control plane, from the cellular device to the core network. The CIoT messages, referred to herein as small data messages, are thus protected by the existing NAS security. However, as explained below, eliminating AS security may leave the RAN node and core network open to undesirable vulnerabilities.

Also, among the different requirements is the elimination of mobility support for CIoT. IoT devices may operate by sending periodic reports throughout a day; they do not remain connected to the core network for long stretches of time. Many IoT devices are stationary, they do not move through cells, rather they remain in a fixed location within the borders of one cell. Other IoT devices, such as those coupled to automobiles, human beings, parcels, etc. move through cells, that is, they roam. As IoT devices roam through a network, when a time comes for them to send a report, they wake up in a cell and send their report from within that cell; cell-to-cell connected mode mobility may not be required.

Therefore, connected mode mobility may not be supported in the CIoT architecture. Elimination of mobility management provides a reduction in overhead for both the eNodeB in the RAN and the MME in the core network. Accordingly, the CIoT architecture introduces a new node referred to as the CIoT Serving Gateway Node (C-SGN). The C-SGN combines any needed functionality remaining from an MME with the functionality of a Serving-Gateway (S-GW). The C-SGN may be equivalent to a Serving General Packet Radio Service (GPRS) Support Node (SGSN) in 3G.

Figure 2:
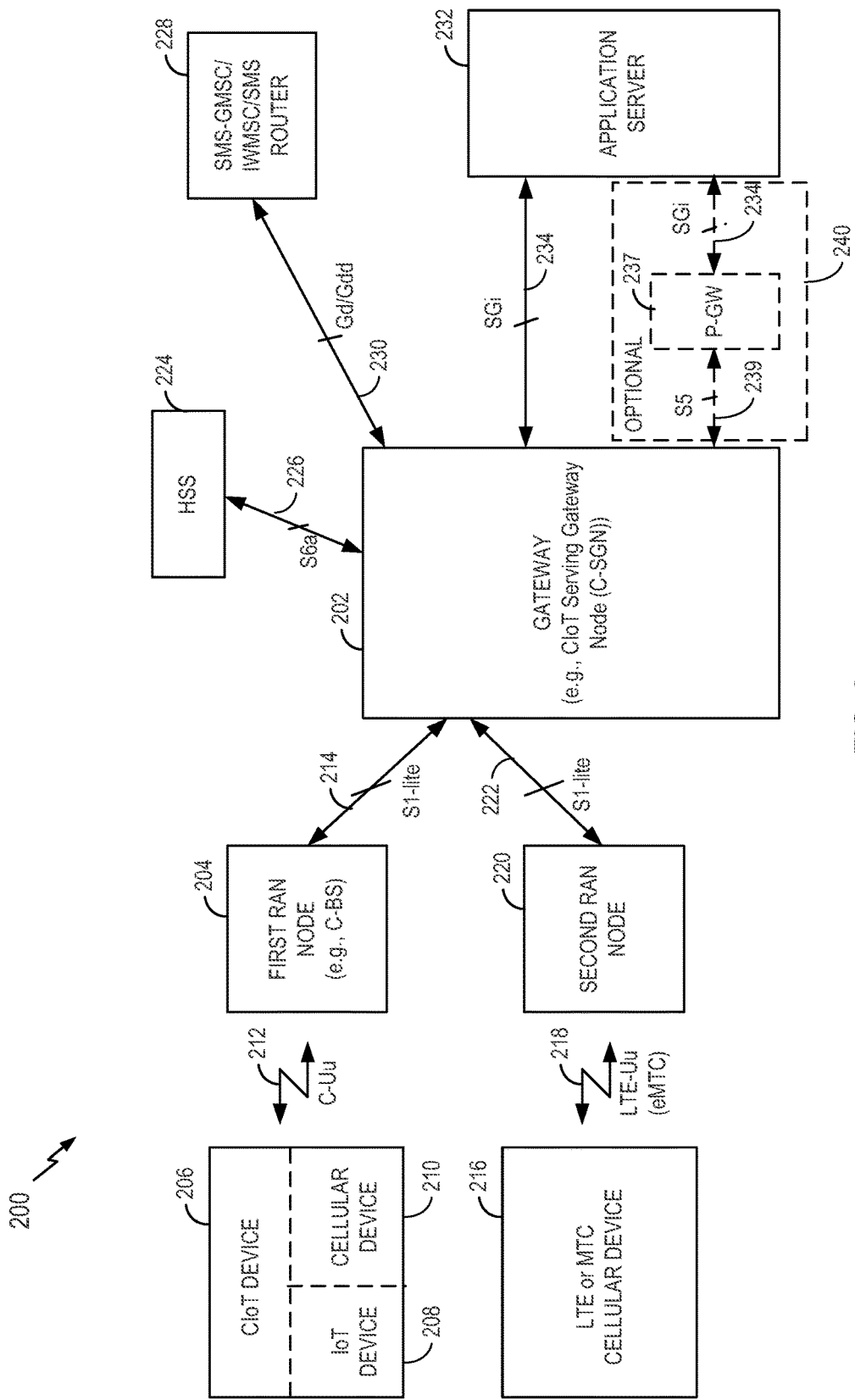
FIG. 2 is a diagram illustrating another example of a communication network within which aspects of the disclosure may find application.

FIG. 2 is a diagram illustrating another example of a communication network 200 within which aspects of the disclosure may find application. For example, techniques presented herein may be used by a gateway 202 (e.g., C-SGN) to provision keys to a first RAN node 204 (e.g., C-BS) and a CIoT device 206. The exemplary illustration of FIG. 2 is representative of a CIoT architecture for a non-roaming scenario involving a CIoT device 206. In the aspect of FIG. 2, the functions of a packet data network gateway (P-GW) can be integrated with that of the gateway 202 (e.g., C-SGN). Additionally or alternatively, as an implementation option 240, the functions of the P-GW can be separated from the gateway 202 in P-GW 237. According to the implementation option 240, an S5 reference point 239 may be used between the gateway 202 (e.g., C-SGN) and the P-GW 237. The S5 reference point may provide user plane tunneling and tunnel management between the gateway 202 (e.g., C-SGN) and the P-GW 237. The S5 reference point may be used, for example, if the gateway 202 (e.g., C-SGN) connects to a non-collocated P-GW 237 for packet data network connectivity. Thus, even in the exemplary non-roaming scenario of FIG. 2, the gateway 202 (e.g., C-SGN) and the P-GW 237 may optionally be separate entities (e.g., they may not be collocated).

In the exemplary illustration of FIG. 2, the keys provisioned by the gateway 202 may be used to integrity protect and/or encrypt small data messages, thereby providing access stratum protection to the communication network 200.

In the example of FIG. 2, the CIoT device 206 may be represented as an IoT device 208 interfaced to a cellular device 210. The interface may be direct (e.g., the IoT device 208 may be hardwired to the cellular device 210) or indirect (e.g., the IoT device 208 may be coupled to the cellular device 210 via an intermediate communication network, such as a Bluetooth wireless network). The CIoT device 206 may wirelessly communicate with the first RAN node 204 (e.g., C-BS) over a C-Uu reference point 212 (reference points may also be referred to as network interfaces). The first RAN node 204 (e.g., C-BS) may communicate with the gateway 202 (e.g., C-SGN) over an S1, or equivalent, reference point. In some aspects, as illustrated in FIG. 2, the first RAN node 204 may communicate with the gateway 202 over an S1-lite 214 reference point. S1-lite is a "lightweight" version of S1 that is optimized for small data messages. For example, only the S1 application protocol (S1AP) messages and information elements (IEs) needed to support CIoT procedures may be included in S1-lite. In general, the reference point (e.g., network interface) may be S1, S1-lite 214, or an equivalent.

Also depicted in FIG. 2 is a Long Term Evolution (LTE) or Machine Type Communication (MTC) cellular device 216. The LTE or MTC cellular device 216 may wirelessly communicate with a second RAN node 220 (e.g., eNodeB) over an LTE Uu (eMTC) reference point 218.

The second RAN node 220 may communicate with the gateway 202 over an S1 reference point. In some aspects, as illustrated in FIG. 2, the second RAN node 220 may communicate with the gateway 202 over an S1-lite 222 reference point.

The gateway 202 may communicate with a home subscriber server 224 (HSS). The HSS 224 may store and update a database containing user subscription information and generates security information from user identity keys. The HSS 224 may communicate with the gateway 202 over an S6a 226 reference point. The S6a 226 reference point enables transfer of subscription and authentication data for authenticating/authorizing user access to the communication network 200. The gateway 202 may communicate with a short message service (SMS) gateway mobile switching center (SMS-GMSC)/Inter Working Mobile Switching Center (IWMSC)/SMS router (i.e., an SMS-GMSC/IWMSC/SMS router 228). In general, the SMS-GMSC/IWMSC/SMS router 228 is a point of contact for short message service with other networks. The SMS-GMSC/IWMSC/SMS router 228 may communicate with the gateway 202 over a Gd/Gdd 230 reference point. The gateway 202 may communicate with an application server 232.

In general, the application server 232 may host applications of service providers. The application server 232 may be located in a packet data network (e.g., the Internet). The application server 232 may communicate with the gateway 202 over an SGi 234 reference point. The SGi 234 is the reference point between the gateway 202 (e.g., C-SGN) and the packet data network.

Figure 3:
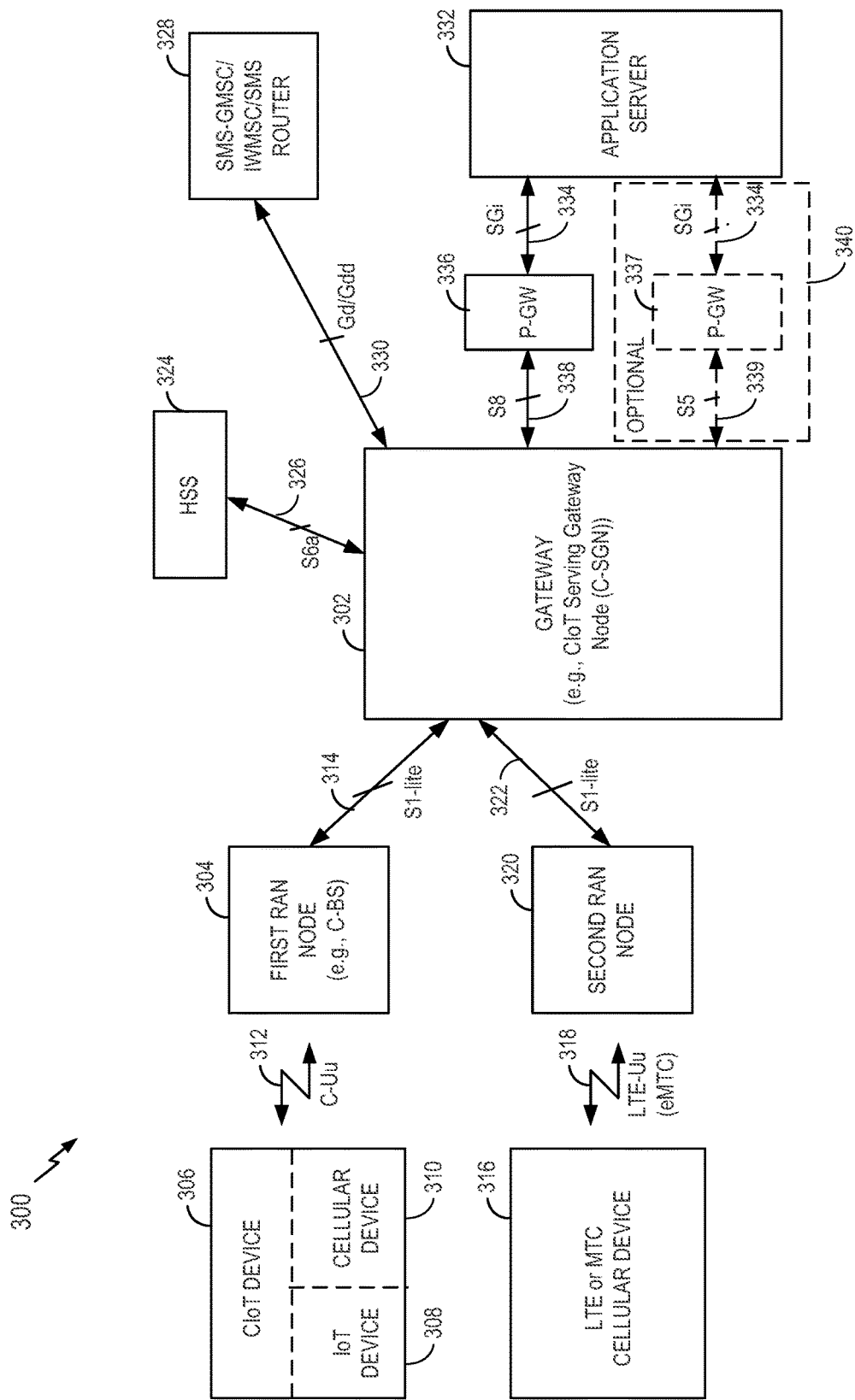
FIG. 3 is a diagram illustrating still another example of a communication network within which aspects of the disclosure may find application.

FIG. 3 is a diagram illustrating still another example of a communication network 300 within which aspects of the disclosure may find application. For example, techniques presented herein may be used by a gateway 302 (e.g., C-SGN) to provision keys to a first RAN node 304 (e.g., C-BS) and a CIoT device 306. The exemplary illustration of FIG. 3 is representative of a CIoT architecture for a roaming scenario involving a CIoT device 306.

In the exemplary illustration of FIG. 3, the keys provisioned by the gateway 302 may be used to integrity protect and/or encrypt small data messages, thereby providing access stratum protection to the communication network 300.

The nodes of FIG. 3 are the same or similar to those of FIG. 2, with the exception of the addition of a packet data network (PDN) gateway (P-GW) 336 node external to, and/or not collocated with, the gateway 302 (e.g., C-SGN). The description of FIG. 3 follows for the sake of completeness.

In the example of FIG. 3, a CIoT device 306 may be represented as an IoT device 308 interfaced to a cellular device 310. The interface may be direct (e.g., the IoT device 308 may be hardwired to the cellular device 310) or indirect (e.g., the IoT device 308 may be coupled to the cellular device 310 via an intermediate communication network, such as a Bluetooth wireless network). The CIoT device 306 may wirelessly communicate with the first RAN node 304 (e.g., C-BS) over a C-Uu reference point 312 (reference points may also be referred to as network interfaces). The first RAN node 304 (e.g., C-BS) may communicate with the gateway 302 (e.g., C-SGN) over an S1 reference point. In some aspects, as illustrated in FIG. 3, the first RAN node 304 may communicate with the gateway 302 over an S1-lite 314 reference point. S1-lite is a version of S1 that is optimized for small data messages. For example, only the S1 application protocol (S1AP) messages and information elements (IEs) needed to support CIoT procedures may be included in S1-lite. In general, the reference point (e.g., network interface) may be S1, S1-lite 314, or an equivalent.

Also depicted in FIG. 3 is a Long Term Evolution (LTE) or Machine Type Communication (MTC) cellular device 316. The LTE or MTC cellular device 316 may wirelessly communicate with a second RAN node 320 (e.g., eNodeB) over an LTE Uu (eMTC) reference point 318.

The second RAN node 320 may communicate with the gateway 302 over an S1 reference point. In some aspects, as illustrated in FIG. 3, the second RAN node 320 may communicate with the gateway 302 over an S1-lite 322 reference point.

The gateway 302 may communicate with a home subscriber server 324 (HSS). The HSS 324 may store and update a database containing user subscription information and generates security information from user identity keys. The HSS 324 may communicate with the gateway 302 over an S6a 326 reference point. The S6a 326 reference point enables transfer of subscription and authentication data for authenticating/authorizing user access to the communication network 300. The gateway 302 may communicate with a short message service (SMS) gateway mobile switching center (SMS-GMSC)/Inter Working Mobile Switching Center (IWMSC)/SMS router (i.e., an SMS-GMSC/IWMSC/SMS router 328). In general, the SMS-GMSC/IWMSC/SMS router 328 is a point of contact for short message service with other networks. The SMS-GMSC/IWMSC/SMS router 328 may communicate with the gateway 302 over a Gd/Gdd 330 reference point. The gateway 302 may communicate with an application server 332.

In general, the application server 332 may host applications of service providers. The application server 332 may be located in a packet data network (e.g., the Internet). The application server 332 may communicate with the P-GW 336 over an SGi 334 reference point. The SGi 334 is the reference point between the P-GW 336 and the application server 332 in the packet data network. The P-GW 336 may communicate with the gateway 302 (e.g., the C-SGN) over an S8 338 reference point. The S8 338 reference point is an inter-Public Land Mobile Network (inter-PLMN) reference point, which generally provides user and control plane interface between a Serving GW (or in the case of FIG. 3, a C-SGN) in a Visitor Public Land Mobile Network (VPLMN) and a P-GW in a Home Public Land Mobile Network (HPLMN).

In the aspect of FIG. 3, the P-GW functions can be separated from the gateway 302 in P-GW 336 or, as an implementation option 340, in P-GW 337. In the case of implementation option 340, an S5 reference point 339 may be used between the gateway 302 (e.g., C-SGN) and P-GW 337. The S5 reference point may provide user plane tunneling and tunnel management between the gateway 302 (e.g., C-SCG) and the P-GW 337. The S5 reference point may be used, for example, if the gateway 302 (e.g., C-SGN) connects to a non-collocated P-GW 237 for packet data network connectivity.

In the exemplary aspects described herein, the cellular device may be interfaced to an Internet of Things (IoT) device. The exemplary aspects are described in relation to data messages (e.g., small data messages) sent between the IoT device and a core network via the cellular device; however, the aspects described herein are not limited to small data messages and have applicability to other types of data messages.

Exemplary Stateless Access Stratum Security Processes

Figure 4:
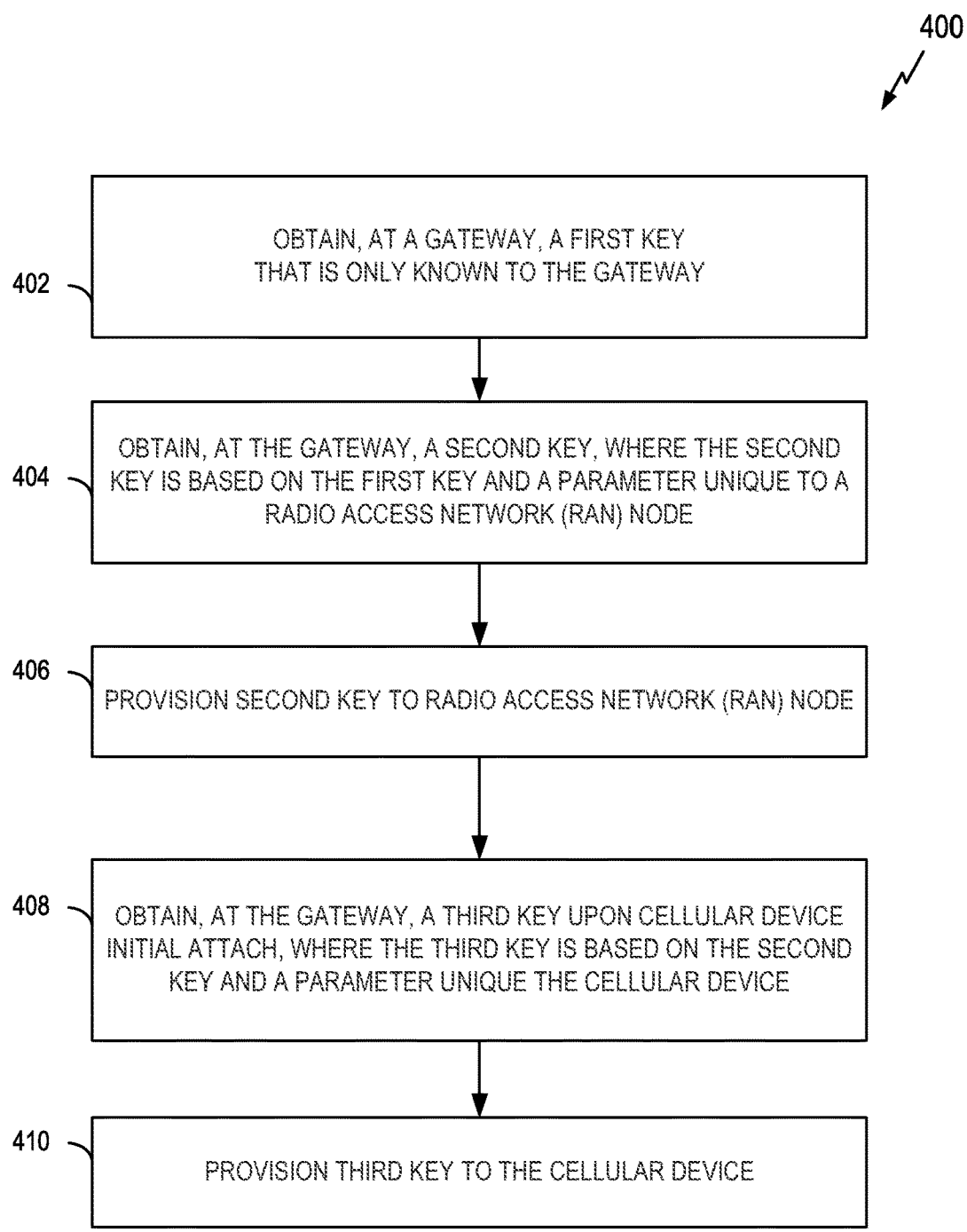
FIG. 4 is a flow diagram illustrating an example of access stratum security key derivation and provisioning process in accordance with some aspects of the disclosure.

FIG. 4 is a flow diagram illustrating an example of access stratum security key derivation and provisioning process 400 in accordance with some aspects of the disclosure. A gateway may first obtain 402 (e.g., derive, generate, compute, retrieve, receive, request, etc.) a first key. The gateway may be a CIoT Serving Gateway Node (C-SGN). The C-SGN may be a gateway that can be implemented to support functionality for CIoT use cases. The C-SCG may incorporate those aspects of an LTE Mobility Management Entity (MME), an LTE Serving Gateway (S-GW), and an LTE Packet Data Network Gateway (P-GW) that are useful for the CIoT use cases. Reference herein to a C-SGN is for convenience. Aspects described herein are not limited to implementations using a C-SGN as a gateway. In some aspects, the terms C-SGN and gateway may be used interchangeably herein.

The first key may be referred to as a Master Access Stratum security Key (MASK). In some aspects, the first key is not obtained from any other key. For example, the first key is not derived from other key material. In some aspects, the first key may be randomly obtained at the C-SGN. For example, in some aspects, the first key may be randomly generated at the C-SGN. The first key may be only known to the C-SGN.

The C-SGN may next obtain 404 a second key. The second key may be referred to as a Base Station Access Stratum security Key (BASK). The second key may be obtained from the first key (e.g., the MASK) and a parameter unique to a radio access network (RAN) node (e.g., eNodeB, C-BS). The parameter unique to the RAN node may be an identity of the RAN node. In one aspect, the identity of the RAN node may be a CIoT Base Station Identity (C-BS ID). A C-BS ID may be equivalent, for example, to an eNodeB ID in LTE. The second key may be obtained using a key derivation function (KDF). For example, the second key may be given as:

Second Key=KDF(MASK,C-BSID), where KDF is a key derivation function, MASK is the first key, and C-BS ID is the CIoT Base Station Identity.

The second key may be provisioned 406 to the RAN node (e.g., C-BS) by the gateway. At least because the second key is based on the first key and the parameter unique to a radio access network (RAN) node, the second key may be provisioned to the RAN node before, during, or after an initial attachment of a cellular device to the cellular network.

The C-SGN may still further obtain a third key. The third key may be referred to as a Device Access Stratum security Key (DASK). The third key may be obtained from the second key (e.g., the BASK) and a parameter unique to the cellular device. The parameter unique to the cellular device may be an identity of the cellular device. The identity of the cellular device may be, for example, an SAE-Temporary Mobile Subscriber identity (S-TMSI).

The third key may be obtained using a key derivation function (KDF). For example, the third key may be given as:

Third Key=KDF(BASK,Cellular Device ID), where KDF is a key derivation function, BASK is the second key, and Cellular Device ID is the identity of the cellular device.

In some aspects, the gateway (e.g., C-GSN) may provision 410 the third key (e.g., the DASK) to the cellular device.

In some aspects, the cellular device may add integrity protection to a small data message, where the integrity protection may be based, for example, on the third key (e.g., the BASK) and the identity of the device. The cellular device may additionally or alternatively encrypt the small data message, where the encryption may be performed using the third key (e.g., the DASK). The integrity protected and/or encrypted small data message may be sent from the cellular device to the RAN node.

The third key may be provisioned (e.g., sent) sent to the cellular device over a secure non-access stratum (NAS) message (i.e., the NAS security mode command is completed). One example of the secure NAS message may be an Attach Accept message, sent to the cellular device upon successful completion of the initial attach procedure. As an alternative, the third key may be sent to the cellular device as an encrypted information element (IE). In this alternative, the IE may include an algorithm identifier that identifies an algorithm used to encrypt the IE.

In some aspects, the RAN node does not establish and/or maintain an access stratum security context with the device. Establishing and/or maintaining an access stratum security context may require the use of state tables and the processing of data, associated with the state tables. The state table and associated processing may represent an expenditure of overhead, which is not desirable, for example, in MT. Instead, there are disclosed herein aspects of a stateless security scheme. For example, the RAN node possesses the second key (e.g., the BASK), which was provisioned to the RAN node by the gateway (e.g., C-SGN). In one example, the RAN node may obtain the third key (e.g., the BASK), on-the-fly (e.g., dynamically, as-needed) from the second key (e.g., the BASK) and the identity of the cellular device. The identity of the cellular device is included with every small data message obtained at the RAN node and the second key is independent of the identity of the cellular device; accordingly, the security scheme is stateless at least in that a state table is not needed.

The RAN node may then use the third key (e.g., the DASK), which it obtained (e.g., derived, generated) on-the-fly, to verify the integrity of and/or decrypt the small data messages that are obtained from the device. Using the exemplary key generation and provisioning schemes described herein, a measure of AS security may be implemented with the aid of existing messages. Overhead is not increased. The RAN node may protect itself and the core network from vulnerabilities such a Denial of Service and/or flooding attacks.

Figure 5:
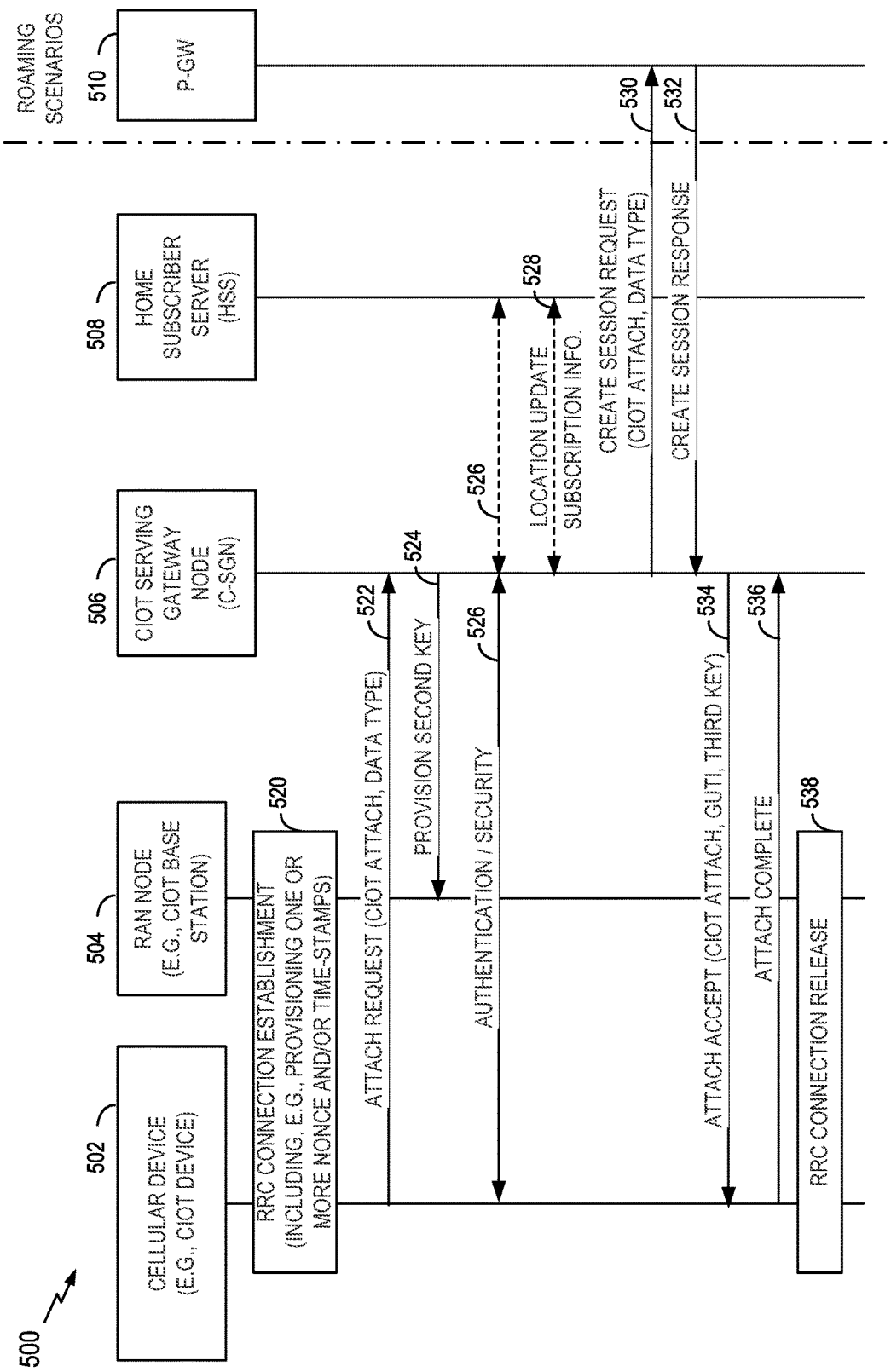
FIG. 5 is a call flow diagram illustrating associated an example of an attach procedure under Cellular Internet of Things (CIoT) in accordance with some aspects of the disclosure.

FIG. 5 is a call flow diagram 500 illustrating an example of an attach procedure under Cellular Internet of Things (CIoT) in accordance with some aspects of the disclosure. In the aspect of FIG. 5, there is included a cellular device 502 (e.g., a CIoT device), a RAN node 504 (e.g., a C-BS), a core network gateway (e.g., CIoT Serving Gateway Node (C-SGN) 506), a home subscriber server (HSS) 508, and a P-GW 510. The P-GW 510 is depicted for scenarios where the cellular device 502 is roaming.

The exemplary call flow of FIG. 5 may begin when an RRC connection establishment procedure is performed 520. During performance of the RRC connection establishment procedure, the cellular device 502 and RAN node 504 may provide one another with one or more nonce values (e.g., the nonce-device, nonce-RAN) and/or one or more time stamp values as explained later herein. The cellular device 502 may perform an attach procedure indicated by sending an attach request 522. During the attach procedure, the cellular device 502 may indicate that the attachment is for a CIoT small data message (e.g., "CIoT Attach" may be included as a parameter of the attach request 522). The RAN node 504 (e.g., C-BS) may select a C-SGN 506 optimized for CIoT based on a cellular device indication or based on a pre-configuration. The cellular device 502 may also indicate a specific data type (e.g., IP and/or non-IP and/or SMS). An Access Point Name (APN) may be indicated. The APN may identify the C-SGN 506 and/or a P-GW 510 to which the cellular device 502 requests connectivity, and may include an APN operator identifier that identifies a Public Land Mobile Network (PLMN) in which the C-SGN 506 is located and/or a PLMN in which the P-GW 510 is located.

As indicated above, the G-SGN 506 may obtain a second key (e.g., the BASK) for the RAN node 504 (e.g., C-BS). The C-SGN 506 may provision the second key to the RAN node 504 (e.g., C-BS) in a NAS message 524.

The C-SGN 506 may perform any needed authentication/security procedures 526.

The C-SGN 506 may perform, with the home subscriber server 508 (HSS), a location update and may retrieve subscription information 528.

The C-SGN 506 may process the attach request 522 and, based on the parameters provided with the attach request 522, may decide if there is a need to establish an IP Bearer Service. If the Data Type parameter is identified as "IP", the PDN type indicates the type of IP address (i.e. IPv4, IPv6) to be allocated. The C-SGN 506 may allocate an IP address based on the PDN type in the attach request 522. NAS Session Management signaling may not be needed. In the roaming scenario, C-SGN 506 may send a Create Session Request (or new control message) to the P-GW indicating this is a CIoT Attach Request and indicating the Data Type 530. The P-GW may allocate an IP address based on the PDN type in the Attach Request.

In the roaming scenario only, depending on the Data Type, the P-GW may send a Create Session response (or new control message) to the C-SGN 532. For the IP data case (e.g., Data Type=IP), the Create Session response may include the allocated IP address.

The C-SGN may respond by sending an Attach Accept message 534 to the cellular device 502 without any session management message. For Data Type=IP, the allocated IP address may be sent to the cellular device 502. The Attach Accept message may include a Globally Unique Temporary Identifier (GUTI). The GUTI may be assigned by the C-SGN (or an MME function of the C-SGN) during an Initial Attach procedure of the cellular device 502.

As indicated above, during the Attach Procedure (e.g., initial attach) the C-SGN 506 may obtain a third key (e.g., the DASK) for the cellular device 502. According to some aspects, the C-SGN 506 may provision the third key to the cellular device in a NAS message (e.g., in the Attach Accept message 534).

The cellular device 502 may respond with an Attach Complete message 536.

The RRC connection may be released 538.

Figure 6:
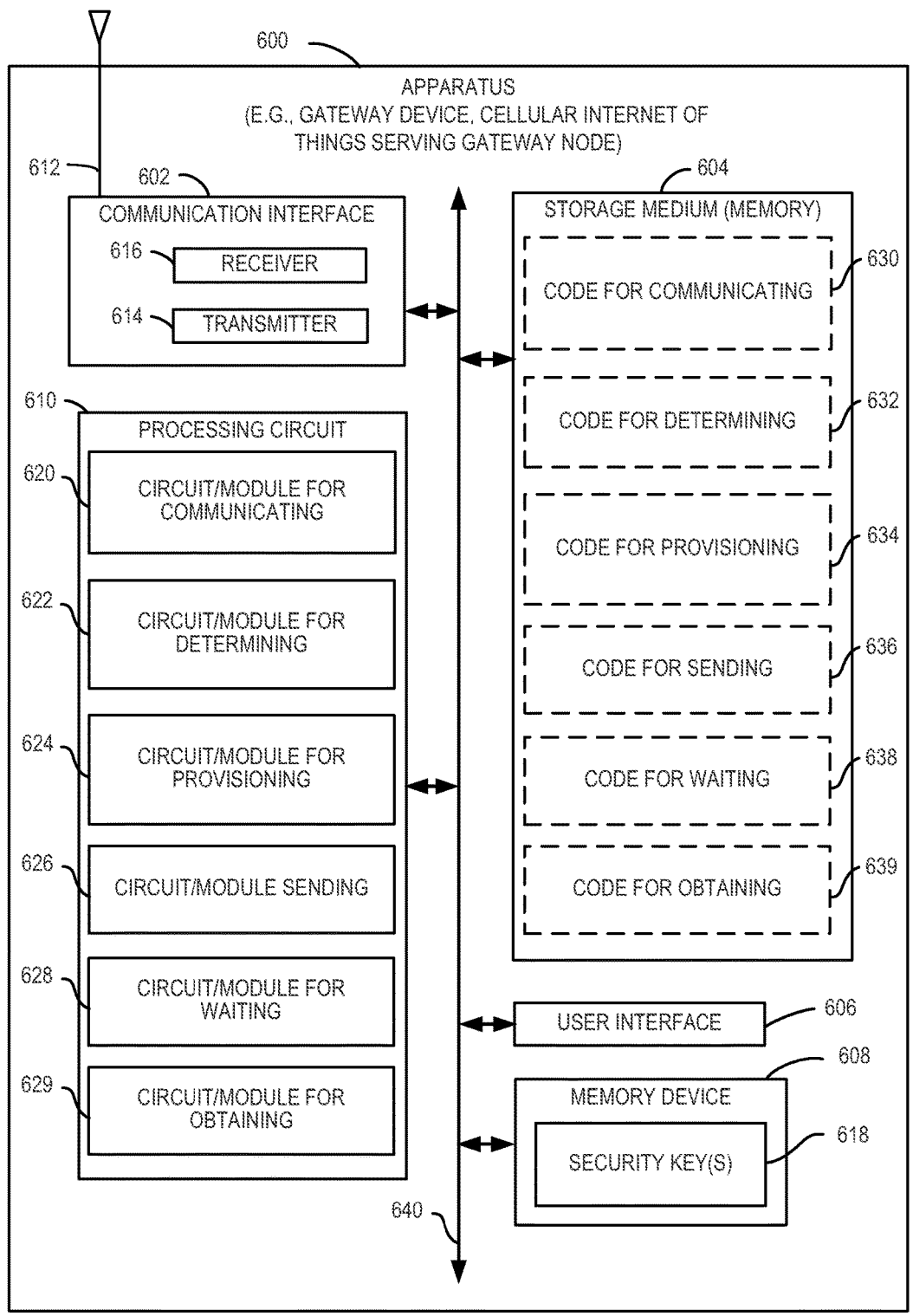
FIG. 6 is a block diagram illustrating an example of a hardware implementation of an apparatus that may support stateless access stratum security and one or more of the obtaining, provisioning, and using of security keys in accordance with some aspects of the disclosure.

FIG. 6 is a block diagram illustrating an example of a hardware implementation of an apparatus 600 (e.g., an electronic device) that can support stateless access stratum security and one or more of the obtaining (e.g., deriving, generating, computing, retrieving, receiving, requesting, etc.), provisioning, and using of security keys in accordance with aspects of the disclosure. The apparatus 600 could be implemented within a gateway (e.g., a C-SGN), a RAN node (e.g., a base station, an eNB, a C-BS), a cellular device (e.g., a CIoT device), or some other type of device that supports wireless communication such as mobile phone, a smart phone, a tablet, a portable computer, a server, a personal computer, a sensor, an entertainment device, a medical device, or any other electronic device having wireless communication circuitry.

The apparatus 600 (e.g., a communication apparatus) may include a communication interface 602 (e.g., at least one transceiver), a storage medium 604, a user interface 606, a memory device 608 (e.g., storing one or more security keys 618), and a processing circuit 610. In various implementations, the user interface 606 may include one or more of: a keypad, a display, a speaker, a microphone, a touchscreen display, of some other circuitry for receiving an input from or sending an output to a user.

These components can be coupled to and/or placed in electrical communication with one another via a signaling bus 640 or other suitable component, represented generally by the connection lines in FIG. 6. The signaling bus 640 may include any number of interconnecting buses and bridges depending on the specific application of the processing circuit 610 and the overall design constraints. The signaling bus 640 links together various circuits such that each of the communication interface 602, the storage medium 604, the user interface 606, and the memory device 608 are coupled to and/or in electrical communication with the processing circuit 610. The signaling bus 640 may also link various other circuits (not shown) such as timing sources, peripherals, voltage regulators, and power management circuits, which are well known in the art, and therefore, will not be described any farther.

The communication interface 602 may be adapted to facilitate wireless communication of the apparatus 600. For example, the communication interface 602 may include circuitry and/or programming adapted to facilitate the communication of information bi-directionally with respect to one or more communication devices in a network. In some implementations, the communication interface 602 may be constructed, adapted, and/or configured for wire-based communication. In some implementations, the communication interface 602 may be coupled to one or more antennas 612 for wireless communication within a wireless communication system. The communication interface 602 may be constructed, adapted, and/or configured with one or more standalone receivers and/or transmitters, as well as one or more transceivers. In the illustrated example, the communication interface 602 includes a transmitter 614 and a receiver 616.

The memory device 608 may represent one or more memory devices. As indicated, the memory device 608 may maintain security keys 618 along with other information used by the apparatus 600. In some implementations, the memory device 608 and the storage medium 604 are implemented as a common memory component. The memory device 608 may also be used for storing data that is manipulated by the processing circuit 610 or some other component of the apparatus 600.

The storage medium 604 may represent one or more non-transient computer-readable, machine-readable, and/or processor-readable devices for storing programming, such as processor executable code or instructions (e.g., software, firmware), electronic data, databases, or other digital information. The storage medium 604 may also be used for storing data that is manipulated by the processing circuit 610 when executing programming. The storage medium 604 may be any available media that can be accessed by a general purpose or special purpose processor, including portable or fixed storage devices, optical storage devices, and various other mediums capable of storing, containing or carrying programming.

By way of example and not limitation, the storage medium 604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 604 may be implemented in an article of manufacture (e.g., a computer program product). By way of example, a computer program product may include a computer-readable medium in packaging materials. In view of the above, in some implementations, the storage medium 604 may be a non-transitory (e.g., tangible) storage medium.

The storage medium 604 may be coupled to the processing circuit 610 such that the processing circuit 610 can read information from, and write information to, the storage medium 604. That is, the storage medium 604 can be coupled to the processing circuit 610 so that the storage medium 604 is at least accessible by the processing circuit 610, including examples where at least one storage medium is integral to the processing circuit 610 and/or examples where at least one storage medium is separate from the processing circuit 610 (e.g., resident in the apparatus 600, external to the apparatus 600, distributed across multiple entities, etc.).

Programming stored by the storage medium 604, when executed by the processing circuit 610, causes the processing circuit 610 to perform one or more of the various functions and/or process operations described herein. For example, the storage medium 604 may include operations configured for regulating operations at one or more hardware blocks of the processing circuit 610, as well as to utilize the communication interface 602 for wireless, or in some implementations wired, communication utilizing their respective communication protocols.

The processing circuit 610 is generally adapted for processing, including the execution of such programming stored on the storage medium 604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 610 may be arranged to obtain, process and/or send data, control data access and storage, issue commands, and control other desired operations. The processing circuit 610 may include circuitry constructed, adapted, and/or configured to implement desired programming provided by appropriate media in at least one example. For example, the processing circuit 610 may be implemented as one or more processors, one or more controllers, and/or other structure constructed, adapted, and/or configured to execute executable programming. Examples of the processing circuit 610 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 610 are for illustration and other suitable configurations within the scope of the disclosure are contemplated.

According to one or more aspects of the disclosure, the processing circuit 610 may be adapted to perform any or all of the features, processes, functions, operations, and/or routines for any or all of the apparatuses described herein. For example, the processing circuit 610 may be adapted to perform and/or can out any one of the operations described in blocks identified with respect to FIGS. 4, 5, 7, 9-12, and 14. As used herein, the term "adapted" in relation to the processing circuit 610 may refer to the processing circuit 610 being one or more of constructed, configured, employed, implemented, and/or programmed to perform a particular process, function, operation, and/or routine according to various features described herein.

The processing circuit 610 may be a specialized processor, such as an application specific integrated circuit (ASIC) that serves as a means for (e.g., structure for) to performing and/or carrying out any one of the operations described in blocks identified with respect to FIGS. 4, 5, 7, 9-12, and 14. The processing circuit 610 may serve as one example of a means for transmitting and/or a means for receiving.

According to at least one example of the apparatus 600, the processing circuit 610 may include one or more of a circuit/module for communicating 620, a circuit/module for determining 622, a circuit/module for provisioning 624, a circuit/module for sending 626, a circuit/module for waiting 628, or a circuit/module for obtaining 629.

As mentioned above, programming stored by the storage medium 604, when executed by the processing circuit 610, causes the processing circuit 610 to perform one or more of the various functions and/or process operations described herein. For example, the storage medium 604 may include one or more of the code for communicating 630, the code for determining 632, the code for provisioning 634, the code for sending 636, the code for waiting 638, or the code for obtaining 639.

Figure 7:
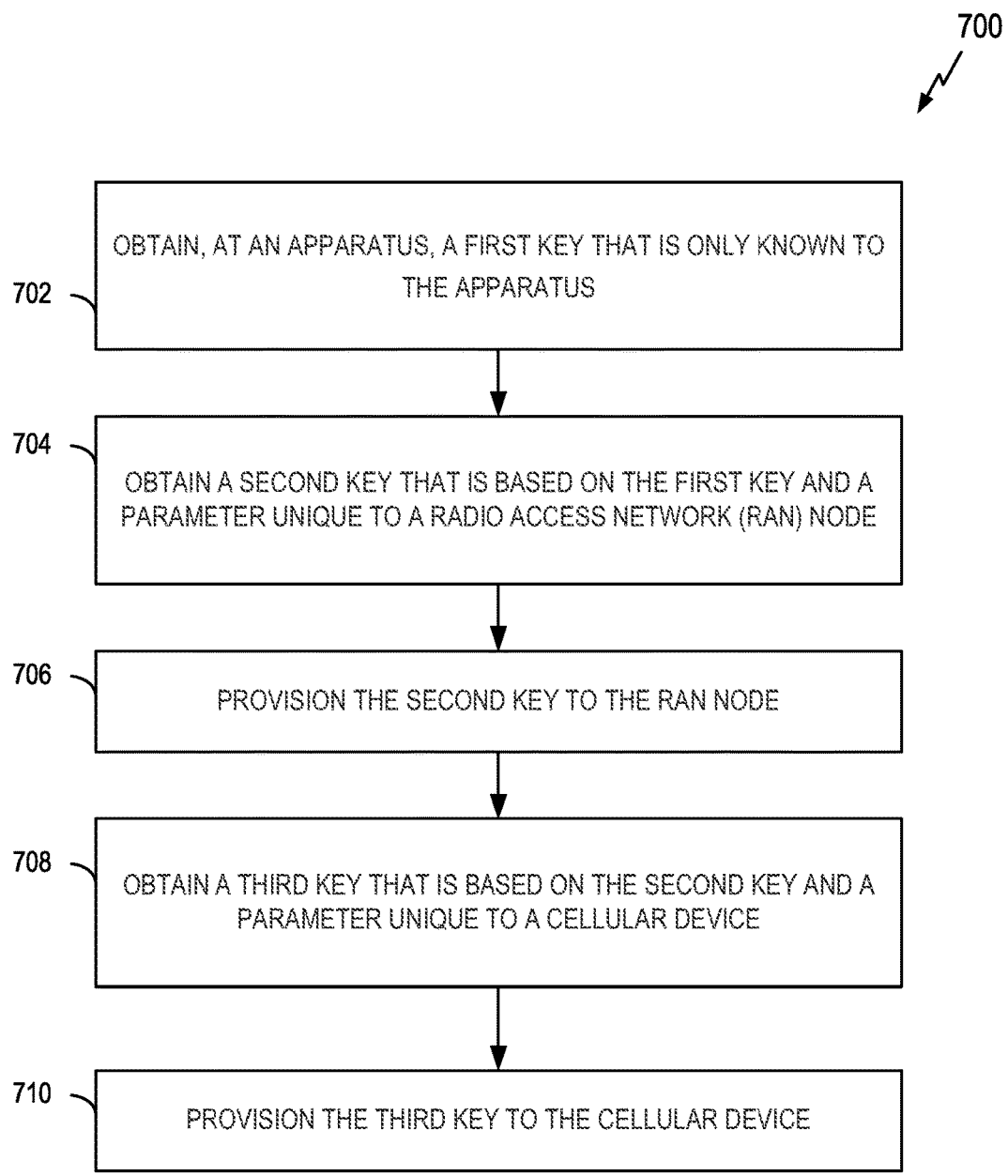
FIG. 7 is a flow diagram illustrating an example of a stateless access stratum security process in accordance with some aspects of the disclosure.

FIG. 7 is a flow diagram illustrating an example of a stateless access stratum security process 700 in accordance with some aspects of the disclosure. The stateless access stratum security process 700 may take place within a processing circuit (e.g., the processing circuit 610 of FIG. 6), which may be located in a gateway (e.g., a C-SGN) or some other suitable apparatus. Accordingly, the stateless access stratum security process 700 may be operational at a gateway (e.g., a C-SGN) or some other suitable apparatus. In various aspects within the scope of the disclosure, the stateless access stratum security process 700 may be implemented by any suitable apparatus capable of supporting stateless access stratum security including one or more of the obtaining, provisioning, and using security keys according to one or more aspects of the disclosure.

According to some aspects, the stateless access stratum security process 700 may be described as a method of communication, which may include obtaining, at an apparatus (e.g., a gateway, a C-SGN), a first key that is only known to the apparatus 702. Obtaining, at the apparatus, a second key that is based on (e.g., derived using, generated using) the first key and a parameter unique to a radio access network (RAN) node 704. Provisioning, by the apparatus, the second key to the RAN node 706. Obtaining, at the apparatus, a third key that is based on the second key and a parameter unique to a cellular device 708. And may further include, provisioning, by the apparatus, the third key to the cellular device 710.

According to some aspects, an apparatus (e.g., a gateway, a C-SGN, a communication apparatus) may obtain a first key (e.g., a Master Access Stratum security Key MASK) that is only known to the apparatus 702. In some aspects, the first key may not be obtained from any other key. In other words, the apparatus may obtain the first key in an absence of obtaining the first key from any other key. In some aspects, the apparatus may randomly generate the first key. In other words, the apparatus may obtain the first key by randomly generating the first key at the apparatus. In some aspects, the apparatus may be a Cellular Internet of Things serving gateway node (C-SGN). In some aspects, only the apparatus (e.g., a gateway, a C-SGN) knows the first key (e.g., the MASK). In other words, in some aspects, the first key is only known to the apparatus.

The apparatus may obtain a second key (e.g., a Master Access Stratum security Key—MASK) that may be based on the first key and a parameter unique to a radio access network (RAN) node 704. In some aspects, the parameter unique to the RAN node may be an identity of the RAN node. In some aspects, the RAN node can be a CIoT base station (C-BS) or an Evolved Node B (eNodeB), and the parameter unique to the RAN node can be a C-BS identity or an eNodeB Identity. In some aspect a key derivation function may be used to obtain (e.g., derive, generate) the second key.

The apparatus may provision the second key to the RAN node 706. In some aspects, the apparatus may provision the second key to the RAN node in a non-access stratum (NAS) message. In some aspects, the non-access stratum message may be a secure NAS message.

The apparatus may obtain a third key (e.g., a Device Access Stratum security Key—DASK) that may be based on the second key and a parameter unique to a cellular device 708. In some aspects, the parameter unique to the cellular device may be a cellular device identity. In some aspects, the parameter unique to the cellular device may be a System Architecture Evolution (SAE) Temporary Mobile Subscriber Identity (S-TMSI). The S-TMSI may be used to locally identify a cellular device within an MME group. The S-TMSI may be used in paging the cellular device. The S-TMSI may be comprised of an MME code and an MME mobile subscriber identity (M-TMSI). In some aspects, a key derivation function may be used to obtain (e.g., derive, generate) the third key.

The apparatus may provision the third key to the cellular device 710. In some aspects, the apparatus may provision the third key to the cellular device in a non-access stratum (NAS) message. In some aspects, the non-access stratum message may be a secure NAS message. In some aspects, the non-access stratum message may be an Attach Accept Message. In some aspects, the apparatus may provision the third key to the cellular device as an encrypted information element (IE). The IE may include an algorithm identifier that identifies an algorithm used to encrypt the IE.

Figure 8:
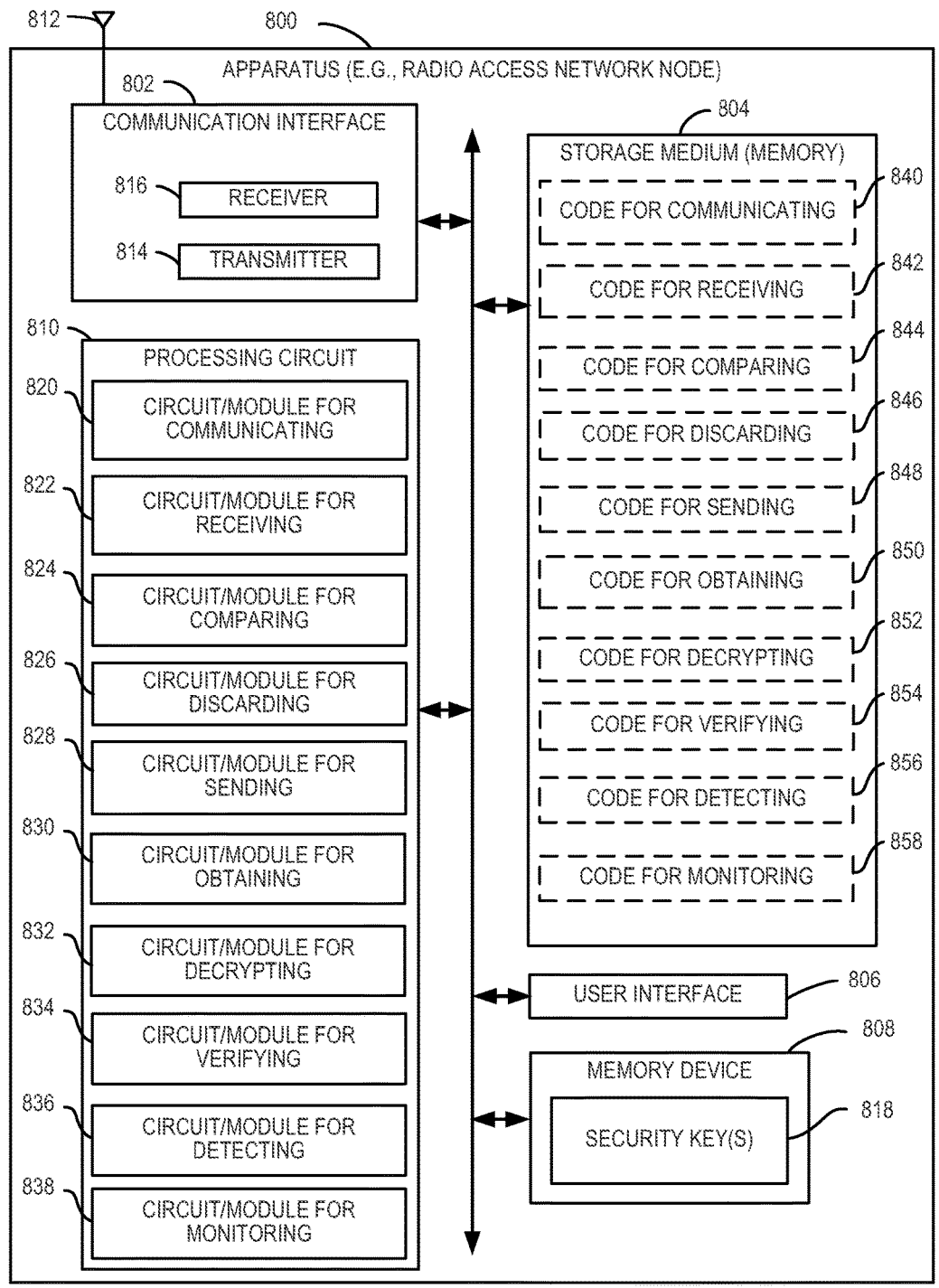
FIG. 8 is a block diagram illustrating another example of a hardware implementation of an apparatus that may support stateless access stratum security and one or more of the obtaining, provisioning, and using of security keys according to one or more aspects of the disclosure.

FIG. 8 is a block diagram illustrating an another example of a hardware implementation of an apparatus 800 (e.g., an electronic device, a communication apparatus) that may support stateless access stratum security and one or more of obtaining, provisioning, and using of security keys according to aspects of the disclosure. The apparatus 800 could be implemented within a gateway (e.g., a C-SGN), a RAN node (e.g., an eNB, a C-BS), a cellular device (e.g., a CIoT device), or some other type of device that supports wireless communication, such as a mobile phone, a smart phone, a tablet, a portable computer, a server, a personal computer, a sensor, an entertainment device, a medical device, or any other electronic device having wireless communication circuitry.

The apparatus 800 may include a communication interface (e.g., at least one transceiver) 802, a storage medium 804, a user interface 806, a memory device 808 (e.g., storing one or more security keys 818), and a processing circuit 810. In various implementations, the user interface 806 may include one or more of: a keypad, a display, a speaker, a microphone, a touchscreen display, or some other circuitry for receiving an input from or sending an output to a user. In general, the components of FIG. 8 may be similar to corresponding components of the apparatus 600 of FIG. 6.

According to one or more aspects of the disclosure, the processing circuit 810 may be adapted to perform any or all of the features, processes, functions, operations, and/or routines for any or all of the apparatuses described herein. For example, the processing circuit 810 may be adapted to perform any of the blocks described with respect to FIGS. 4, 5, 7, 9-12, and 14. As used herein, the term "adapted" in relation to the processing circuit 810 may refer to the processing circuit 810 being one or more of constructed, configured, employed, implemented, and/or programmed to perform a particular process, function, operation, and/or routine according to various features described herein.

The processing circuit 810 may be a specialized processor, such as an application specific integrated circuit (ASIC) that serves as a means for (e.g., structure for) carrying out any one of the operations described in conjunction with FIGS. 4, 5, 7, 9-12, and 14. The processing circuit 810 may serve as one example of a means for transmitting and/or a means for receiving.

According to at least one example of the apparatus 800, the processing circuit 810 may include one or more of a circuit/module for communicating 820, a circuit/module for receiving 822, a circuit/module for comparing 824, a circuit/module for discarding 826, a circuit/module for sending 828, a circuit/module for obtaining 830, a circuit/module for decrypting 832, a circuit/module for verifying 834, a circuit/module for detecting 836, or a circuit/module for monitoring 838.

As mentioned above, programming stored by the storage medium 804, when executed by the processing circuit 810, may cause the processing circuit 810 to perform one or more of the various functions and/or process operations described herein. For example, the storage medium 804 may include one or more of the code for communicating 840, the code for receiving 842, the code for comparing 844, the code for discarding 846, the code for sending 848, the code for obtaining 850, the code for decrypting 852, the code for verifying 854, the code for detecting 856, or the code for monitoring 858.

Figure 9:
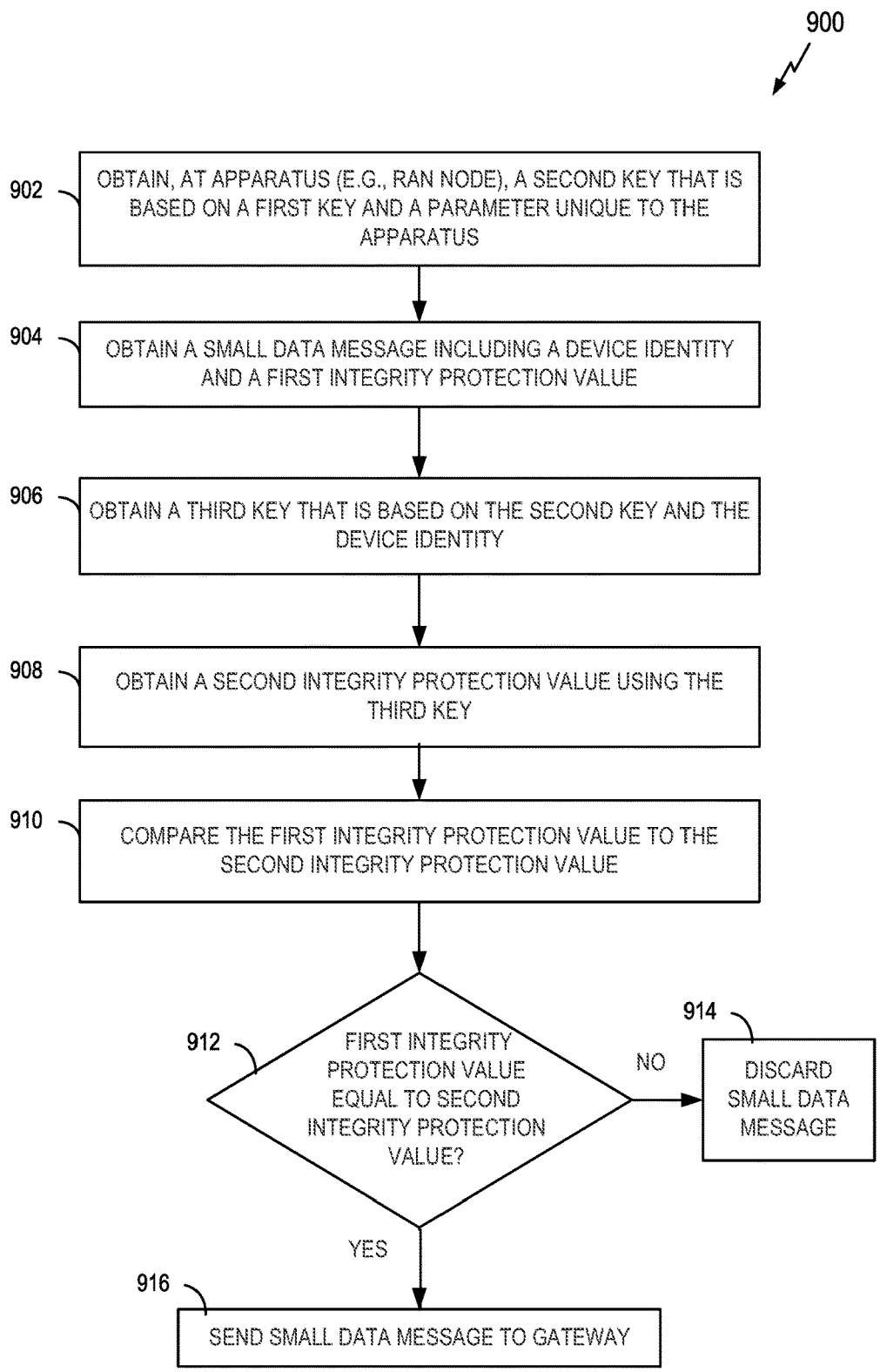
FIG. 9 is a flow diagram illustrating another example of a stateless access stratum security process in accordance with some aspects of the disclosure.

FIG. 9 is a flow diagram illustrating an example of a method of stateless access stratum security protected communication 900 in accordance with some aspects of the disclosure. The method of stateless access stratum security protected communication 900 may take place within a processing circuit (e.g., the processing circuit 810 of FIG. 8), which may be located in a radio access network (RAN) node (e.g., eNB, C-BS) or some other suitable apparatus. Accordingly, the method of stateless access stratum security protected communication 900 may be operational at a RAN node or some other suitable apparatus. In various aspects within the scope of the disclosure, the method of stateless access stratum security protected communication 900 may be implemented by any suitable apparatus capable of supporting stateless access stratum security including one or more of the obtaining, provisioning, and using security keys according to one or more aspects of the disclosure.

In the aspect of FIG. 9, when a cellular device sends a small data message to a RAN node (e.g., eNB, C-BS), the cellular device may protect (e.g., integrity protect and/or encrypt) the small data message using a third key (e.g., the DASK) provisioned to the cellular device by a gateway (e.g., C-SGN) during an initial attach procedure. A small data message protected (e.g., integrity protected and/or encrypted) with the third key may be referred to herein as a "protected message." The third key may be based on a second key (e.g., the BASK) and the identity of the cellular device. The second key may be provisioned to the RAN node by the gateway before, during, or after the device sends the protected message to the RAN node. The second key may be stored at the RAN node, for example, in a long term memory device (e.g., memory device 808, FIG. 8), a temporary memory, or a cache.

When the RAN node receives a protected message from a cellular device, the RAN node may determine that the message, includes an integrity protection value (e.g., a message authentication code (MAC), a token). The RAN node may verify the integrity protection value using, for example, a third key that the RAN node may obtain (e.g., derive, generate) on-the-fly from items (e.g., second key, device ID) known or available to the RAN node. For example, as stated, the third key may be based on (e.g., derived using, generated using) the second key (e.g., the BASK) and the identity of the cellular device (e.g., device ID, S-TMSI). The second key may be provisioned to the RAN node from the gateway, while the identity of the cellular device (e.g., an S-TMST) may be included in the small data message received by the RAN node.

In accordance with exemplary aspects described herein, the second key (e.g., the BASK) may not be cellular-device-specific (e.g., the second key may not be unique to a given cellular device). Even though the third key may be cellular-device-specific, the RAN node (e.g., base station, eNB, C-BS) is not obligated to maintain a security context (a UE state, a cellular device state) for the cellular device to implement access stratum security. Instead, to verify and/or decrypt a protected message from the cellular device, the RAN node may use the second key (e.g., the BASK) and the device ID to obtain the third key on-the-fly, and use the third key to verify and/or decrypt the protected message from the cellular device. A second key may be provided to the RAN node by each gateway (e.g., C-SGN) to which the RAN node is associated. The device ID may be included with the small data message to be verified and/or decrypted. The RAN node may obtain (e.g., derive, generate, compute, retrieve, receive, request, etc.) the third key of the cellular device on-the-fly when the RAN node receives a protected message from the cellular device. Accordingly, the exemplary access stratum security scheme related to obtaining the third key (e.g., the DASK) is stateless.

In some implementations, the second key may be RAN-node-specific. In other implementations, the second key may be RAN-node-group-specific (e.g., a plurality of RAN nodes may have a common group identifier). In implementations where the second key is RAN-node-group-specific, the second key may be shared among a plurality of RAN nodes in a given group. When the second key is shared among the plurality of RAN nodes, even if a cellular device connects to different RAN nodes in the given group, the cellular device may not need to obtain a new third key (e.g., DASK) from the gateway (e.g., C-SGN) for each RAN node encountered in the given group. Therefore, instead of obtaining (e.g., deriving, generating) a second key (e.g., BASK) based on a first key (e.g., MASK) and RAN node identity (e.g., eNB ID), the gateway (e.g., C-SGN) may obtain the second key (e.g., BASK) from the first key (e.g., MASK) and a RAN node group identity. In other words, within the coverage of the given RAN node group (i.e., the given RAN node group), the RAN nodes of the given group share a same second key (e.g., BASK). Accordingly, the cellular device (e.g., CIoT device, UE) can use a third key (e.g., DASK) that is common to the plurality of RAN nodes in the given RAN node group to protect small data messages sent (and/or to verify and/or decrypt small data messages received) within the coverage of the given RAN node group. In some implementations, the network may configure a RAN node group and announce the availability of the RAN node group as a part of system information (SI).

According to some aspects, the method of stateless access stratum security protected communication 900 may be described as a method of security protected communication. Stateless access stratum security protected communication may protect the communication with, for example, integrity protection and/or ciphering (generally referred to herein as encryption or decryption). The method may, including obtaining, at an apparatus (e.g., a RAN node, a C-BS, an eNB), a second key that is based on (e.g., derived using, generated using) a first key and a parameter unique to the apparatus 902. Obtaining, at the apparatus, a small data message including a device identity and a first integrity protection value 904. Obtaining, at the apparatus, a third key that is based on the second key and the device identity 906. Obtaining, at the apparatus, a second integrity protection value obtained (e.g., derived, generated) using the third key 908. Integrity protection processes may be performed (to yield integrity protection values) using the third key, and may further be performed using, for example, the device identity, one or more notices, and the small data message being protected. Comparing, at the apparatus, the first integrity protection value to the second integrity protection value 910. Obtaining a comparison result/determining if the first integrity protection value is equal to the second integrity protection value 912. Discarding, from the apparatus, the small data message if a comparison result indicates that the first integrity protection value is not equal to the second integrity protection value 914. Alternatively, sending, from the apparatus, the small data message to a gateway if the comparison result indicates that the first integrity protection value is equal to the second integrity protection value 916.

According to some aspects, an apparatus (e.g., a RAN node, a C-BS, an eNB) may obtain a second key (e.g., a BASK), wherein the second key is based on a first key and a parameter unique to the apparatus 902. In some aspects, the second key is obtained from a gateway, in some aspects, the first key is only known to the gateway. In some aspects, the gateway is a C-SGN. In some aspects, the parameter unique to the RAN node is an identity of the RAN node. For example, the RAN node may be a CIoT base station (C-BS) or an Evolved Node B (eNodeB), and the parameter unique to the RAN node may be the C-BS Identity or the eNodeB Identity.

The apparatus (referred to for convenience as the "apparatus" or alternatively as the "RAN node" in association with the following description of FIG. 9) may receive a small data message including a device identity and a first integrity protection value 904.

The apparatus may obtain a third key (e.g., the DASK) that is based on the second key and the device identity 906.

The apparatus may obtain a second integrity protection value using the third key 908.

In one aspect, the first and second integrity protection values may be values ascribed to (e.g., attributed to, calculated from) a token. In one aspect, the first and second integrity protection values may be values ascribed to a message authentication code (MAC). As used herein, a token and/or a MAC may be referred to as an integrity protection parameter. For example, in scenarios where aspects of AS security protection described herein are used for the uplink traffic (e.g., from device to RAN node), the RAN node may need to provide a nonce (e.g., nonce-RAN) to the device for use in AS security protection. In such a scenario, a MAC as shown below may be used:

$$MAC=F(DASK,S\text{-}TMSI|nonce\text{-}RAN|message).$$

According to one alternative, another way to obtain a MAC may use the following equations:

$$K_{MAC}=KDF(DASK,nonce\text{-}RAN)$$

where $K_{MAC}$ is a one-time MAC generation key obtained based on DASK and the nonce-RAN; and KDF is a key derivation function.

$$MAC=F(K_{MAC},message).$$

According to still another alternative, to take into account the case for multiple messages being sent for a single connection (e.g., RRC connection), a counter may be incorporated to generate a MAC of each message, i.e., $$MAC=F(K_{MAC},Counter|message),$$

where the Counter is initialized (e.g., to zero) when a new key (i.e., $K_{MAC}$ is derived and increased by a certain value (e.g., 1) for every single message for the connection.

In still another alternative, in scenarios where aspects of AS security protection described herein are used for uplink traffic (e.g., from device to RAN node) and/or downlink traffic (e.g., from RAN node to device), the device may need to provide a nonce (e.g., nonce-device) to the RAN node to for use in AS security protection. In such a scenario, a MAC as shown below may be used:

$$MAC=F(DASK,S\text{-}TMSI|nonce\text{-}device|nonce\text{-}RAN\text{-}|message),$$

where, for all equations shown above, F is a MAC generation function (e.g., CMAC, HMAC) ("F" may alternatively be referred to as an integrity protection algorithm herein), DASK is an example of the second key, S-TMSI is an example of an identity of a cellular device, nonce-device is a first arbitrary number that may only be used once and is provided by the device, nonce-RAN is a second arbitrary number that may only be used once and is provided by the RAN node, and message is the message (e.g., small data message) being sent.

According to another alternative, another way to obtain a MAC may use the following equations:

$$K_{MAC}=KDF(DASK,S\text{-}TMSI|nonce\text{-}device|nonce\text{-}RAN)$$

where $K_{MAC}$ is a one-time MAC generation key obtained based on DASK, nonce-device and nonce-RAN; and KDF is a key derivation function.

$$MAC=F(K_{MAC},message)$$

According to still another alternative, to take into account the case for multiple messages being sent for a single connection (e.g., RRC connection), a counter may be incorporated to generate a MAC of each message, i.e., $$MAC=F(K_{MAC},Counter|message),$$

where the Counter is initialized (e.g., to zero) when a new key (i.e., $K_{MAC}$) is derived and increased by a certain value (e.g., 1) for every single message for the connection.

The integrity protection parameter (e.g., MAC, token) may incorporate one or more nonce (e.g., nonce-device and/or nonce-RAN) to prevent replay attacks. In other words, the one or more nonce may be used for replay protection. The nonce-device and/or nonce-RAN may be exchanged between the device and RAN node during a random access procedure. For example, the device may send the nonce-device to the RAN node in message 3 (RRC Connection Request) of the random access procedure and the RAN node may send the nonce-RAN to the device in message 4 (RRC Connection Setup) of the random access procedure. If there is more than one message to be sent, the nonce (e.g., nonce-device and/or nonce-RAN) may be incremented by a predetermined fixed amount (e.g., 1) for each message.

As an alternative to the nonce (e.g., nonce-device and/or nonce-RAN), any random number that may be changed (e.g., to prevent replay attacks) is acceptable. In some aspects, the nonce may be replaced with (e.g., substituted by) a timestamp. The timestamp may be used if the cellular device and the apparatus (e.g., the RAN node, the C-BS) have a timer. Accordingly, in some aspects, and by way of example, one or more of the nonce (e.g., nonce-device and/or nonce-RAN) in the exemplary MACs provided above may be replaced with (e.g., substituted by) a randomly selected number and/or a timestamp.

As still another alternative, in some aspects, one or more of the nonce (e.g., nonce-device and/or nonce-RAN), in the exemplary MACs provided above may be replaced with (e.g., substituted by) a Cell-Radio Network Temporary Identity (C-RNTI). The C-RNTI may be a unique identification used for identifying an RRC Connection and scheduling that is dedicated to a particular cellular device (e.g., is device-unique), in such a scenario, for example, the first and second integrity protection parameters may be a message authentication code (MAC) obtained using the parameter C-RNTI instead of nonce-device and nonce-RAN. For example, $$MAC=F(DASK,S\text{-}TMSI|C\text{-}RNTI|message),$$

where F is a MAC generation function (e.g., CMAC, DASK is an example of the second key, S-TMSI is an example of an identity of a cellular device, C-RNTI is an identity that is assigned to the device during RRC connection establishment, and message is the message (e.g., small data message) being sent. Use of this alternative may be influenced by the strength of the privacy policies used by a network in assigning the S-TMST and C-RNTI identifiers. For example, this alternative may be used under an assumption that a network has good privacy policies to assign those identifiers.

$$K_{MAC}=KDF(DASK,S\text{-}TMSI|C\text{-}RNTI),$$

where $K_{MAC}$ is a one-time MAC generation key obtained based on DASK, S-TMSI and C-RNTI; and KDF is a key derivation function.

$$MAC=F(K_{MAC},message)$$

To take into account the case for multiple messages being sent for a single connection (e.g., RRC connection), a counter may be incorporated to generate a MAC of each message, i.e., $$MAC=F(K_{MAC}, Counter|message)$$

Where the Counter is initialized (e.g., to zero) when a new key (i.e., $K_{MAC}$) is derived and increased by a certain value (e.g., 1) for every single message for the connection.

In the exemplary alternatives described above, the integrity protection algorithm (e.g., the function F) used to obtain (e.g., derive, generate) the integrity protection parameter (e.g., MAC, token) may be determined by the network and informed to the device. This also applies to ciphering algorithms, as described below.

Accordingly, in some aspects, the first integrity protection parameter and the second integrity protection parameter may incorporate one or more nonce, random numbers, time stamps, and/or network assigned unique (e.g., C-RNTI) parameters. A method operational at a RAN node may include provisioning, by the RAN node, a nonce (e.g., nonce-RAN), random number, time stamp, and/or network assigned unique (e.g., C-RNTI) parameter to a cellular device. A method operational at a RAN node may include provisioning by the RAN node, a nonce (e.g., nonce-RAN), random number, time stamp, and/or network assigned unique (e.g., C-RNTI) parameter to a cellular device during a random access procedure. A method operational at a device may include provisioning, by the device, a nonce (e.g., nonce-device), random number, time stamp, and/or network assigned unique parameter to a RAN node. A method operational at a device may include provisioning, by the device, a nonce (e.g., nonce-RAN), random number, time stamp, and/or network assigned unique parameter to the RAN node during a random access procedure.

The apparatus may compare the first integrity protection value to the second integrity protection value 910.

The apparatus may discard the small data message if a comparison result indicates that the first integrity protection value is not equal to the second integrity protection value 914.

The apparatus may send the small data message to a gateway (e.g., next hop) if a comparison result indicates that the first integrity protection value is equal to the second integrity protection value 916.

As indicated above, in some aspects the first integrity protection parameter and the second integrity protection parameter may incorporate a random number and/or a time stamp to prevent replay attacks. In some aspects, the RAN node may receive the small data message from a device that is identified by the device identity, and the RAN node provisions the random number to the device. For example, the small data message may be obtained from a device that is identified by the device identity and the random number may be a nonce provisioned by the RAN node to the device during a random access procedure. The nonce may be incremented by a predetermined fixed amount for each message sent from the RAN node to the device.

The following process may also be used to implement a method of security protected communication. The method may include obtaining, at a radio access network (RAN) node, a second key that is based on a first key and a parameter unique to the RAN node, obtaining, at the RAN node, a small data message including a device identity and a first integrity protection value, obtaining, at the RAN node, a third key that is based on the second key and the device identity, obtaining, at the RAN node, a second integrity protection value based on the third key, comparing, at the RAN node, the first integrity protection value to the second integrity protection value, discarding, from the RAN node, the small data message if a comparison result indicates that the first integrity protection value is not equal to the second integrity protection value, and sending, from the RAN node, the small data message to a gateway if the comparison result indicates that the first integrity protection value is equal to the second integrity protection value. According to some aspects, the second key is obtained from a gateway. According to some aspects, the gateway is Cellular Internet of Things serving gateway node (C-SGN). According to some aspects, the RAN node is a Cellular Internet of Things (CIoT) base station (C-BS) or an Evolved Node B (eNodeB), and the parameter unique to the RAN node is a CBS Identity or an eNodeB Identity. According to some aspects, the first integrity protection value and the second integrity protection value are obtained using at least one nonce and/or a time stamp. According to some aspects, the device identity identifies a device, and the method further includes provisioning a first nonce and/or the time stamp to the device and/or obtaining a second nonce from the device. According to some aspects, provisioning the first nonce and/or the time stamp and obtaining the second nonce occur during a random access procedure. According to some aspects, the small data message is encrypted with the third key, and the method further includes decrypting, at the RAN node, the small data message using the third key. According to some aspects, prior to obtaining the small data message, the method further includes monitoring, by the RAN node, a traffic load value; detecting, by the RAN node, that the traffic load value exceeds a predetermined threshold value; and sending a message, to a device that is identified by the device identity, that requests the device to include the first integrity protection value in a next one or more messages sent to the RAN node, in response to detecting that the traffic load value exceeds the predetermined threshold value. According to some aspects, a network configures the predetermined threshold value. According to some aspects, prior to obtaining the small data message, the method further includes configuring and/or negotiating an access stratum security configuration during an initial attach procedure with a device that is identified by the device identity, wherein the access stratum security configuration specifies whether small data messages are sent from the device without security, with integrity protection, with encryption, with integrity protection and encryption, and/or with on-demand integrity protection, wherein integrity protection and encryption are performed using the third key.

Figure 10:
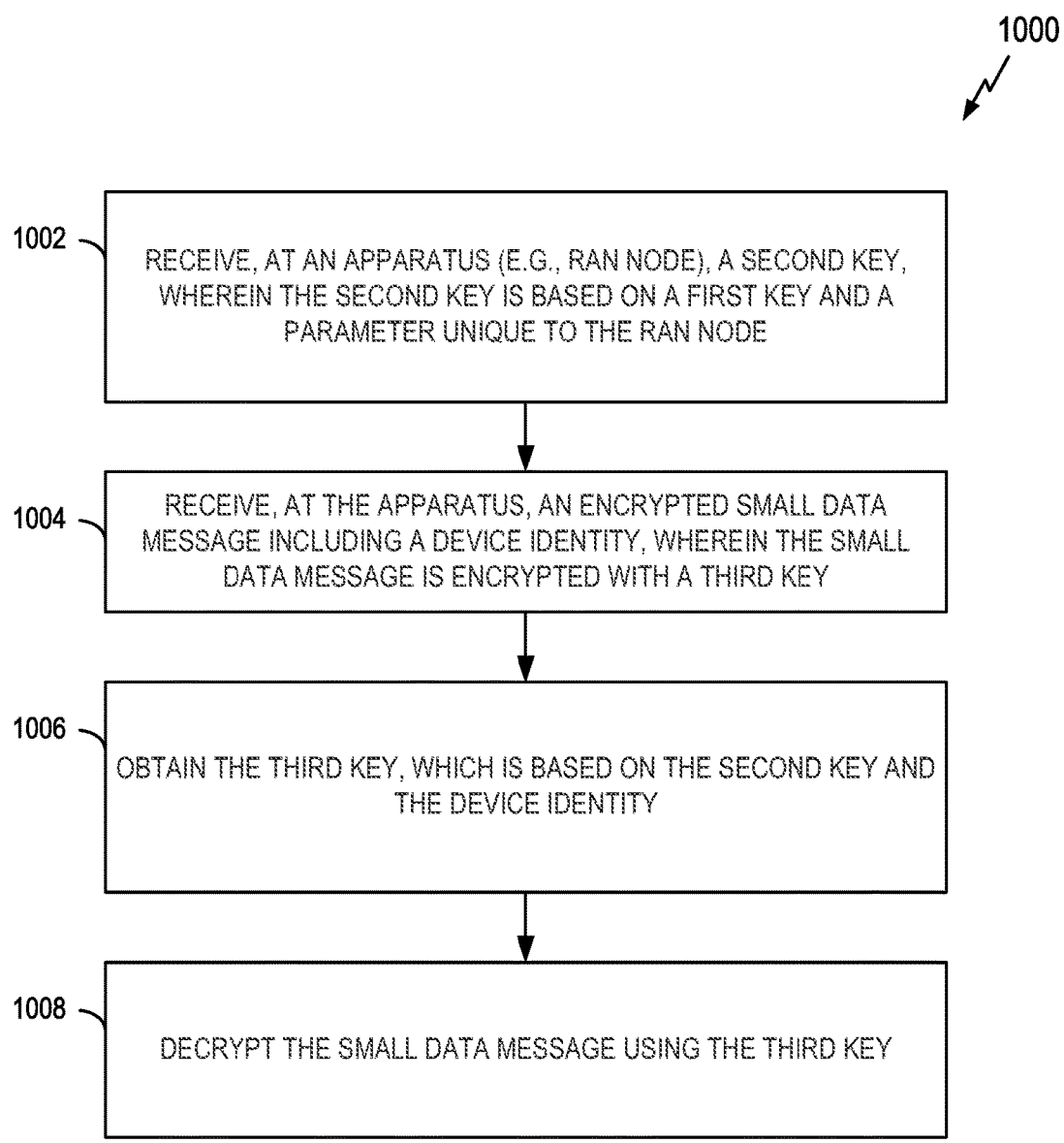
FIG. 10 is a flow diagram illustrating another example of a stateless access stratum security process in accordance with some aspects of the disclosure.

FIG. 10 is a flow diagram illustrating another example of a stateless access stratum security process 1000 in accordance with some aspects of the disclosure. The stateless access stratum security process 1000 may take place within a processing circuit (e.g., the processing circuit 810 of FIG. 8), which may be located in a radio access network (RAN) node (e.g., C-BS) or some other suitable apparatus. Accordingly, the stateless access stratum security process 1000 may be operational at a RAN node (e.g., a C-BS) or some other suitable apparatus. Of course, in various aspects within the scope of the disclosure, the stateless access stratum security process 1000 may be implemented by any suitable apparatus capable of supporting stateless access stratum security including one or more of the obtaining, provisioning, and using security keys according to one or more aspects of the disclosure.

In the aspect of FIG. 10, when a cellular device sends a small data message to a RAN node (e.g., C-BS), the cellular device may encrypt the small data message using a third key (e.g., the DASK) provisioned to the cellular device by a gateway C-SGN) during an initial attach procedure. When the RAN node (e.g., C-BS) receives the small data message from the cellular device, the RAN node may obtain the third key (e.g., the DASK) on-the-fly using the second key (e.g., the BASK) that may be provisioned to the RAN node by the gateway and the identity of the cellular device that may be carried in with the encrypted small data message obtained by the RAN node. For example, the encrypted small data message may be carried with the S-TMSI of the cellular device.

Encryption may use a nonce provided by the RAN node (e.g., C-BS) to the cellular device during a random access procedure. In one aspect, the nonce may be provided as an Initialization Vector (IV). For example:

Ciphertext=Enc(DASK,IV,message), where Enc is an encryption function (e.g., AES-CTR, . . . ), BASK is an example of the second key, and IV is a nonce provided as the Initialization Vector.

An alternative way of encryption using a one-time key, as before:

$K_{Enc}$=KDF(DASK,nonce), where $K_{Enc}$ is a one-time encryption key obtained based on DASK and S-TMSI, C-RNTI, nonce-device, nonce-RAN or combination thereof; and KDF is a key derivation function.

Ciphertext=Enc($K_{Enc}$,IV,message), where the IV is initialized to a certain value (e.g., 0, or a value obtained based on S-TMSI, C-RNTI nonce-RAN, nonce-device, or combination thereof).

To take into account the case for multiple messages being sent for a single connection (e.g., RRC connection), a counter may be incorporated to generate a ciphertext of each message, i.e., Ciphertext=Enc($K_{Enc}$,IV,message), where the IV is initialized (e.g., 0, or a value obtained based on S-TMSI, C-RNTI, nonce-RAN, nonce-device, or combination thereof) when a new key (i.e., $K_{Enc}$) is derived and increased by a certain value (e.g., 1) for every single message for the connection.

As before, the RAN node may obtain the third key (e.g., the DASK) based on the second key (e.g., the BASK) and the identity of the cellular device.

In some aspects, inclusion of the IV in the message is optional because the RAN node (e.g., C-BS) can store the nonce (e.g., the nonce used as/set to the IV) for a short amount of time (e.g., for the duration of an RRC connection).

In some aspects, the nonce is a randomly selected number that is provided by the apparatus (e.g., the RAN node, the C-BS) to the cellular device during a random access procedure. If there is more than one message to be sent, the nonce may be incremented by a predetermined fixed amount (e.g., 1) for each message. Alternately, any random number that is provided by the apparatus (e.g., the RAN node, the C-BS) to the cellular device and that may be changed (e.g., to prevent replay attacks) is acceptable. In some aspects, the nonce may be replaced with a C-RNTI. In some aspects, the nonce may be replaced by a timestamp. The timestamp may be used if the cellular device and the apparatus (e.g., the RAN node, the C-BS) have a timer.

Turning now to FIG. 10, an apparatus (e.g., a RAN node, a C-BS) may receive a second key (e.g., a BASK), wherein the second key is based on a first key and a parameter unique to the apparatus (e.g., the RAN node, the C-BS)) 1002. In some aspects, the RAN node receives the second key from a gateway, and the first key is only known by the gateway. In some aspects, the gateway is a C-SGN. In some aspects, the parameter unique to the RAN node is an identity of the RAN node. For example, the RAN node may be a CIoT base station (C-BS) or an Evolved Node B (eNodeB), and the parameter unique to the RAN node may be the C-BS Identity or the eNodeB Identity.

The apparatus may receive an encrypted small data message including a device identity. In some aspects the small data message is encrypted with a third key (e.g., the DASK) 1004

The apparatus may obtain the third key (e.g., the DASK), which is based on the second key and the device identity 1006.

The apparatus may decrypt the small data message using the third key 1008.

In some aspects, encryption and decryption may incorporate a random number and/or a time stamp to prevent replay attacks. In some aspects, the small data message may be obtained from a device that is identified by the device identity and the RAN node provisions the random number to the device. For example, the small data message may be obtained from a device that is identified by the device identity and the random number may be a nonce provisioned by the RAN node to the device during a random access procedure. The nonce may be incremented by a predetermined fixed amount for each message sent from the RAN node to the device.

Figure 11:
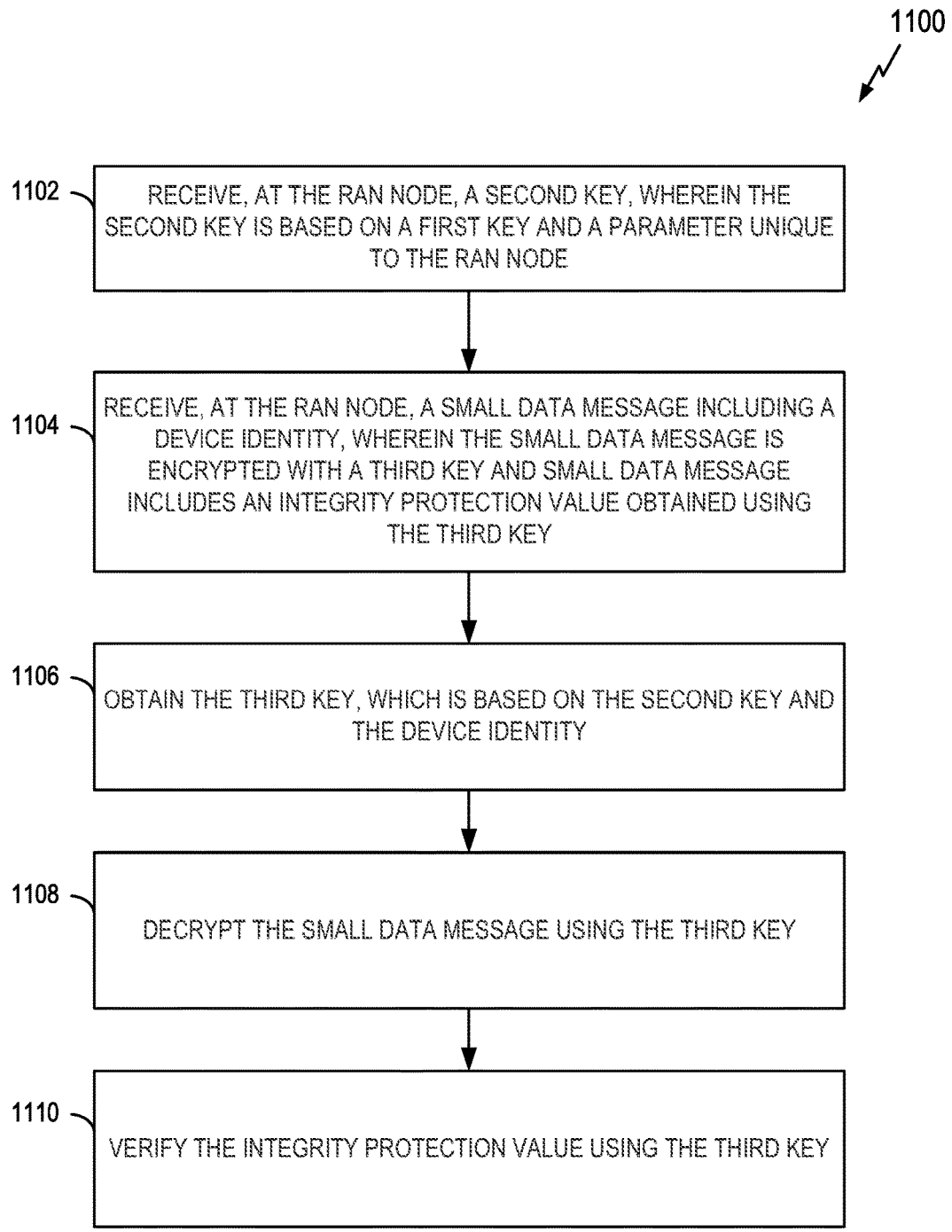
FIG. 11 is a flow diagram illustrating another example of a stateless access stratum security process in accordance with some aspects of the disclosure.

FIG. 11 is a flow diagram illustrating another example of a stateless access stratum security process 1100 in accordance with some aspects of the disclosure. The stateless access stratum security process 1100 may take place within a processing circuit (e.g., the processing circuit 810 of FIG. 8), which may be located in a radio access network (RAN) node (e.g., C-BS) or some other suitable apparatus. Accordingly, the stateless access stratum security process 1100 may be operational at a RAN node (e.g., a C-BS) or some other suitable apparatus. Of course, in various aspects within the scope of the disclosure, the stateless access stratum security process 1100 may be implemented by any suitable apparatus capable of supporting stateless access stratum security including one or more of the obtaining, provisioning, and using security keys according to one or more aspects of the disclosure.

In the aspect of FIG. 11, both encryption and integrity protection may be enabled. When both encryption and integrity protection are configured for use, an Authenticated Encryption With Associated Data (AEAD) cipher may be used. Access stratum security may be configured and/or negotiated during an initial attach procedure.

Turning now to FIG. 11, an apparatus (e.g., a radio access network (RAN) node, a C-BS) may receive a second key (e.g., a BASK), wherein the second key is based on a first key and a parameter unique to the apparatus (e.g., the RAN node, the C-BS) 1102. In some aspects, the RAN node receives the second key from a gateway, and the first key is only known by the gateway. In some aspects, the gateway is a C-SGN. In some aspects, the parameter unique to the RAN node is an identity of the RAN node. For example, the RAN node may be a CIoT base station (C-BS) or an Evolved Node B (eNodeB), and the parameter unique to the RAN node may be the C-BS Identity or the eNodeB Identity.

The apparatus may receive a small data message including a device identity. In some aspects the small data message may be encrypted with a third key (e.g., the DASK) and the small data message may include an integrity protection value derived or generated using the third key 1104.

The apparatus may obtain the third key (e.g., the DASK), which is based on the second key and the device identity 1106.

The device may decrypt the small data message using the third key 1108.

The device may verify the integrity protection value using the third key 1110.

Figure 12:
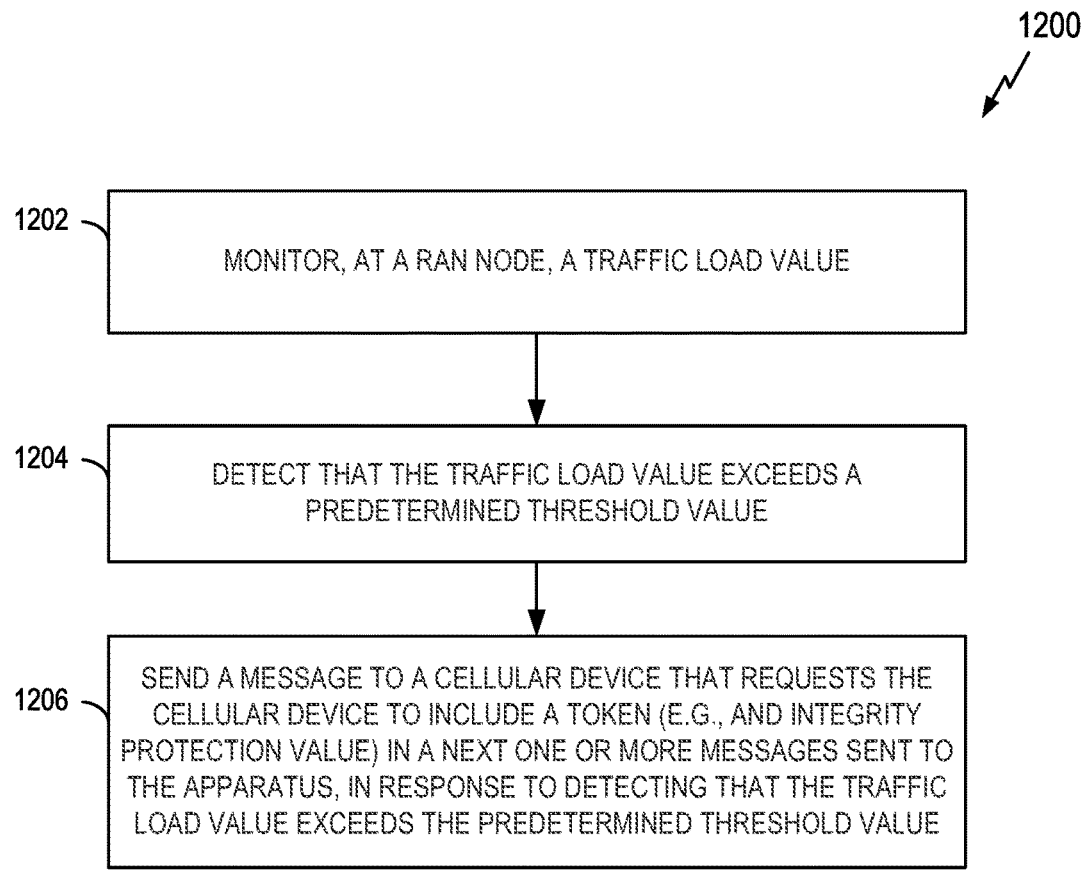
FIG. 12 is a flow diagram illustrating another example of a stateless access stratum security process in accordance with some aspects of the disclosure.

FIG. 12 is a flow diagram illustrating another example of a stateless access stratum security process 1200 in accordance with some aspects of the disclosure. The stateless access stratum security process 1200 may take place within a processing circuit (e.g., the processing circuit 810 of FIG. 8), which may be located in a radio access network (RAN) node (e.g., C-BS) or some other suitable apparatus. Accordingly, the stateless access stratum security process 1200 may be operational at a RAN node (e.g., a C-BS) or some other suitable apparatus. Of course, in various aspects within the scope of the disclosure, the stateless access stratum security process 1200 may be implemented by any suitable apparatus capable of supporting stateless access stratum security including one or more of the obtaining, provisioning, and using security keys according to one or more aspects of the disclosure.

In the aspect of FIG. 12, an exemplary on-demand integrity protection process employing a token is depicted. According to one aspect, in a normal or first mode of operation, no access stratum security is configured; in a second mode of operation, access stratum security is configured. For example, when congestion and/or overload are detected at a RAN node (e.g., C-BS) or some other network node, the RAN node (e.g., the C-BS) may send a message (e.g., indication, request, instruction, command) to a cellular device. The message may cause (or may trigger) the cellular device to include a token with one or more messages (e.g., small data messages) sent to the RAN node (e.g., the CBS). In one example, congestion and/or overload may be detected based on a high volume of small data message transfers. In one example, congestion and/or overload may be detected, and the sending of the indication/request/instruction/command may be triggered when a traffic load exceeds a given threshold. In some aspects, the threshold may be predefined. In some aspects, the network may configure the threshold.

According to some aspects, the token may be created in the same way as the MAC for integrity; however, unlike the MAC for integrity, the token according to this aspect is provided on-demand from the RAN node (e.g., provided responsive to a demand from the RAN node).

For example, during a random access procedure, the RAN node (e.g., C-BS) and the device may exchange respective nonce (e.g., nonce-RAN, nonce-device) as previously explained. Additionally, the RAN node may provide an indication/request/instruction/command to the cellular device to send a token with the next one or more small data messages transferred. The token may be created as Token=$F$(DASK,$S$-TMSI|nonce-device|nonce-RAN-|message), where F is a token generation function (e.g., CMAC, HMAC), DASK is the third key, S-TMSI is an identity of the cellular device (other parameters that identify the cellular device may be used), nonce-device, and nonce-RAN were described above, and message is the message being sent. If there is more than one message to be sent, the nonce may be incremented by a fixed amount (e.g., 1) for each message.

When a RAN node (e.g., C-BS) receives a message carrying the token from the cellular device, RAN node may obtain the third key (e.g., DASK) on-the-fly, where the third key may be based on the second key (e.g., the BASK) and the identity of the cellular device. The RAN node may then verify the token, for example, by obtaining (e.g., deriving, generating) a second token according to the equation provided above, and comparing the received token to the second token.

In some aspects, a nonce may be carried in the cellular device message or temporarily stored at the RAN node (e.g., C-BS).

Because, in various implementations, this on-demand integrity protection process employing a token is triggered during congestion/overload, the on-demand integrity protection process minimizes computational overhead that would otherwise incur to the cellular device and RAN node (e.g., C-BS) if access stratum security (e.g., LTE access stratum security) was activated at all times.

Turning now to FIG. 12, an apparatus (e.g., a radio access network (RAN) node) may monitor a traffic load value 1202.

The apparatus may detect that the traffic load value exceeds a predetermined threshold value 1204. In one example, a network (e.g., a core network) may configure the predetermined threshold value.

The apparatus may send a message (e.g., indication, request, instruction, command) to a cellular device (e.g., a CIoT device) that requests the cellular device to include a token in a next one or more messages sent to the apparatus (RAN node, C-BS), in response to detecting that the traffic load value exceeds the predetermined threshold value 1206.

Figure 13:
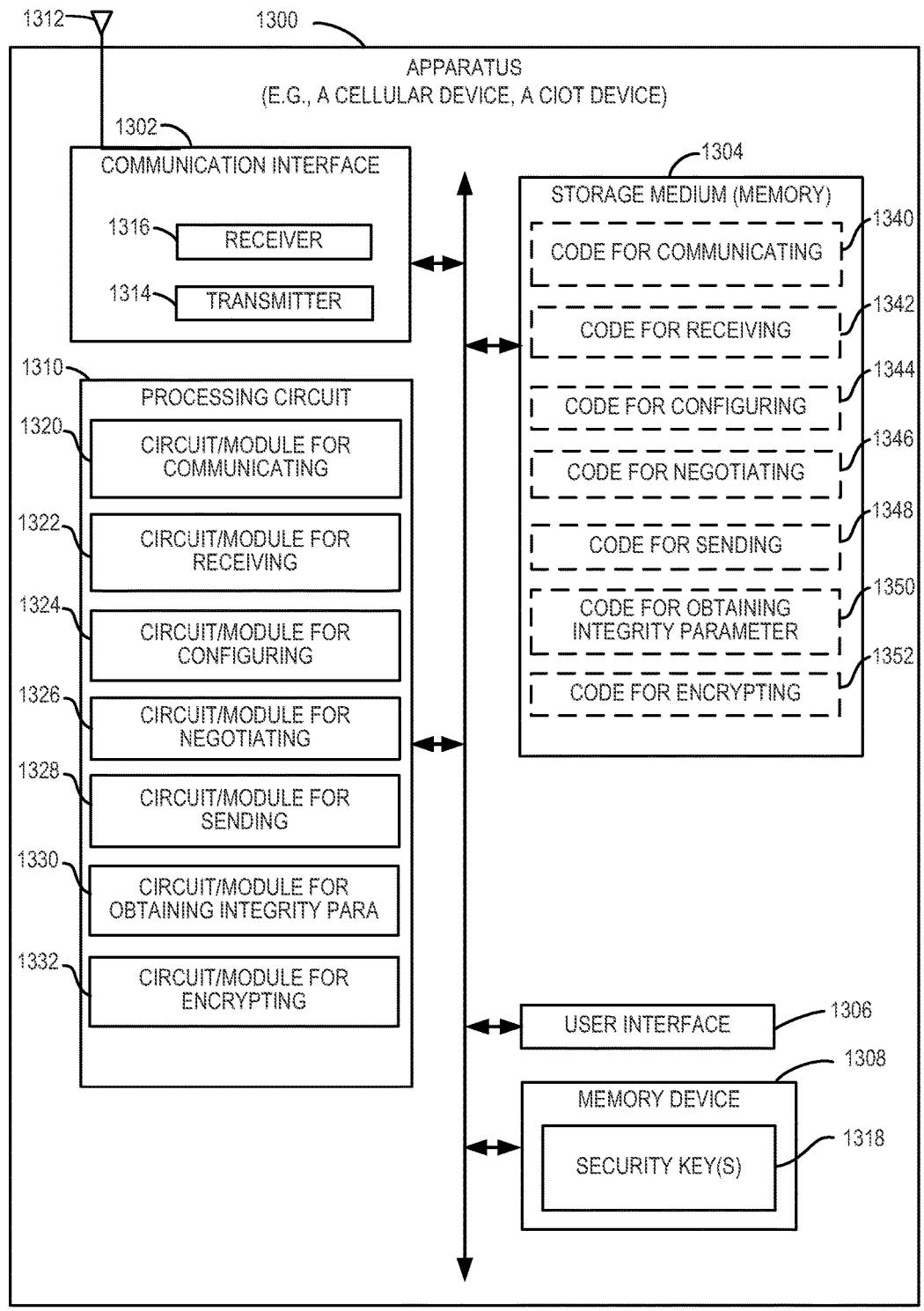
FIG. 13 is a block diagram illustrating another example of a hardware implementation of an apparatus that may support stateless access stratum security and one or more of the obtaining, provisioning, and using of security keys according to one or more aspects of the disclosure.

FIG. 13 is a block diagram illustrating another example of a hardware implementation of an apparatus 1300 (e.g., a cellular device, a CIoT device, an electronic device, a communication apparatus) that may support stateless access stratum security and one or more of the obtaining, provisioning, and using security keys according to one or more aspects of the disclosure. The apparatus 1300 could be implemented within a gateway (e.g., a C-SGN), a RAN node (e.g., a base station, an eNB, sa C-BS), a cellular device, a CIoT device, or some other type of device that supports wireless communication such as a mobile phone, a smart phone, a tablet, a portable computer, a server, a personal computer, a sensor, an entertainment device, a medical device, or any other electronic device having wireless communication circuitry.

The apparatus 1300 includes a communication interface (e.g., at least one transceiver) 1302, a storage medium 1304, a user interface 1306, a memory device 1308 (e.g., storing one or more security keys 1318), and a processing circuit 1310. In various implementations, the user interface 1306 may include one or more of a keypad, a display, a speaker, a microphone, a touchscreen display, of some other circuitry for receiving an input from or sending an output to a user. In general, the components of FIG. 13 may be similar to corresponding components of the apparatus 600 of FIG. 6.

According to one or more aspects of the disclosure, the processing circuit 1310 may be adapted to perform any or all of the features, processes, functions, operations, and/or routines for any or all of the apparatuses described herein. For example, the processing circuit 1310 may be adapted to perform any of the blocks, steps, functions, and/or processes described with respect to FIGS. 4, 5, 7, 9-12, and 14. As used herein, the term "adapted" in relation to the processing circuit 1310 may refer to the processing circuit 1310 being one or more of constructed, configured, employed, implemented, and/or programed to perform a particular process. Function, operation, and/or routine according to various features described herein.

The processing circuit 1310 may be a specialized processor, such as an application specific integrated circuit (ASIC) that serves as a means for (e.g., structure for) carrying out any one of the operations described in conjunction with FIGS. 4, 5, 7, 9-12, and 14. The processing circuit 1310 may serve as one example of a means for transmitting and/or a means for receiving.

According to at least one example of the apparatus 1300, the processing circuit 1310 may include one or more of a circuit/module for communicating 1320, a circuit/module for receiving 1322, a circuit/module for configuring 1324, a circuit/module for negotiating 1326, a circuit/module for sending 1328, a circuit/module for obtaining integrity parameter 1330, or a circuit/module for encrypting 1332.

As mentioned above, programming stored by the storage medium 1304, when executed by the processing circuit 1310, causes the processing circuit 1310 to perform one or more of the various function; and/or process operations described herein. For example, the storage medium 1304 may include one or more of the code for communicating 1340, the code for receiving 1342, the code for configuring 1344, the code for negotiating 1346, the code for sending 1348, the code for obtaining integrity parameter 1350, or the code for encrypting 1352.

Figure 14:
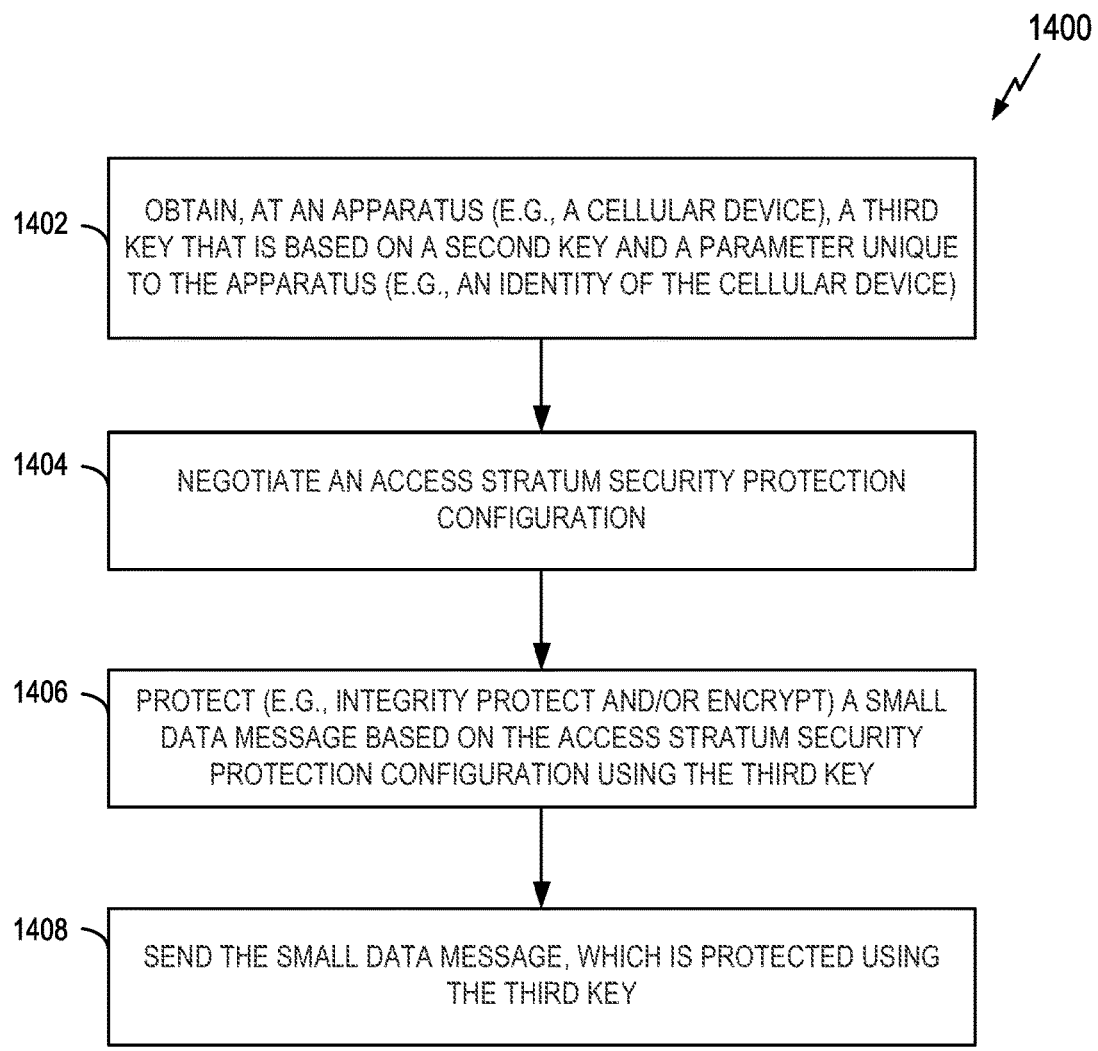
FIG. 14 is a flow diagram illustrating another example of a stateless access stratum security process in accordance with some aspects of the disclosure.

FIG. 14 is a flow diagram illustrating another example of a stateless access stratum security process 1400 in accordance with aspects of the disclosure. The stateless access stratum security process 1400 may take place within a processing circuit (e.g., the processing circuit 1310 of FIG. 13), which may be located in a cellular device (e.g., a CIoT device) or some other suitable apparatus. Accordingly, the stateless access stratum security process 1400 may be operational at a cellular device or some other suitable apparatus. Of course, in various aspects within the scope of the disclosure, the stateless access stratum security process 1400 may be implemented by any suitable apparatus capable of supporting stateless access stratum security including one or more of the obtaining, provisioning, and using security keys according to one or more aspects of the disclosure.

Turning now to FIG. 14, an apparatus (e.g., a cellular device, a CIoT device) may obtain a third key (e.g., DASK) that is based on a second key (e.g., BASK) and a parameter unique to the apparatus 1402. In some aspects, the parameter unique to the apparatus may be an identity of the apparatus (e.g., identity of the cellular device, a cellular device ID, a CIoT device ID). In some aspects, the second key may be based on a first key and a RAN node identity or a RAN node group identity. The apparatus may not know the second key and the first key. In some aspects, for example, the second key may be based on a first key and a parameter unique to the RAN node, and the first key may be only known to a gateway.

The apparatus may configure and/or negotiate an access stratum security configuration 1404. In some aspects, the apparatus may negotiate an access stratum security configuration with a RAN node. In some aspects, the apparatus may negotiate an access stratum security configuration during an initial attach procedure. In some aspects, the apparatus may negotiate an access stratum security configuration with the RAN node during an initial attach procedure. According to some aspects, the access stratum security configuration may specify whether small data messages are sent from the cellular device without security, with integrity protection, with encryption, with integrity protection and encryption, and/or with on-demand integrity protection, wherein integrity protection and encryption may be performed using the third key.

The apparatus may protect a small data message based on the access stratum security configuration using the third key 1406. The apparatus may protect a small data message with integrity protection and/or encryption using the third key. The apparatus may send the small data message protected using the third key 1408. In some aspects, the apparatus may send the small data message protected using the third key to the RAN node.

With respect to all aspects and implementations described herein, a gateway (e.g., a C-SGN) may change the first key (e.g., the MASK) periodically. According to some aspects, the first key may be associated with a first index (e.g., the MASK index). For example, the first key may be determined by the first index. In one aspect, each time (each period) that the first key changes, the first index may change.

According to some aspects, the second key (e.g., the BASK) may be associated with a second index (e.g., the BASK index). The second index may be determined by the first index (e.g., the MASK index). For example, a RAN node (e.g., a C-BS) may be provisioned with a second key having a second index that corresponds to the first index that is presently valid (e.g., not expired, active).

According to some aspects, the third key (e.g., the DASK) may be associated with a third index (e.g., the DASK index). The third index may be determined by the second index (e.g., the BASK index). For example, a cellular device (e.g., a CIoT device) may be provisioned with a third key having a third index that corresponds to the second index that is presently valid (e.g., not expired, active).

The third key index (e.g., the DASK index) may be included in a small data message so that an entity (e.g., a RAN node, a C-BS) obtaining the small data message a can obtain (e.g., derive, generate) the third key (e.g., the DASK) that should be used for access stratum security verification and/or decryption in accordance with aspects described herein.

The changing of any key first, second, and/or third key) may, for example, be due to time expiration, security, maintenance, detection of key compromise, or detection of malicious device(s).

According to one aspect, when a key is not valid (e.g., due to time expiration, security, maintenance, detection of key compromise, detection of malicious device(s), etc.), an error message may be sent to a cellular device and/or a gateway (e.g., C-SGN).

At a cellular device, upon obtaining the error message, the cellular device may send a request for a third key (e.g., a DASK) to the gateway (e.g., C-SGN). The request for the third key may be referred to as a key request message (and may alternatively be referred to as a DASK update message). The key request message may not be protected by access stratum security as discussed in aspects described herein.

The key request message and/or the error message may be sent to the gateway, for example, to trigger the gateway to send (e.g., push) a new third key (e.g., a new DASK) to the cellular device using a secure NAS control message. In one aspect, when the gateway changes the key for a given cellular device (e.g., sends a new third key), the gateway may provision other cellular devices (e.g., those whose third keys may be based on a compromised second key) with respective new keys simultaneously. However, according to other aspects, when the gateway changes the key for a given cellular device (e.g., sends a new third key), the gateway may not provision other cellular devices with respective new keys simultaneously.

Alternatively, the key request message (e.g., DISK update) may be triggered by a device by sending a message protected with an old key to the gateway (e.g., C-SGN).

A gateway (e.g., C-SGN) may use multiple different first keys (e.g., MASKs) and corresponding different second keys (e.g., BASKs) at the same time. The simultaneous use of different first keys and corresponding different second keys may, for example, reduce the impact of key changes and/or improve security in general.

According to some aspects, an access stratum security protected message may obtain a greater priority than (e.g., may be prioritized over) a message that does not use access stratum security protection at a RAN node (e.g., a C-BS). According to some aspects, an access stratum security protected message may obtain a greater priority than (e.g., may be prioritized over) a message that does not use access stratum security protection at a RAN node when the RAN node (e.g., a C-BS) is congested or overloaded.

According to some aspects, CIoT may not support connected mode mobility (i.e., handover procedure). Accordingly, access stratum security according to some aspects described herein may also not support connected mode mobility.

According to some aspects described herein, when a cellular device (e.g., a CIoT device) attaches to a new RAN node (e.g., a C-BS), the cellular device may send a key request message, as described above. For example, the cellular device may send a key request message to the new RAN node. According to some aspects, if the cellular device is attached to the previously attached RAN node (e.g., C-BS), the cellular device can use the third key (e.g., DASK) associated with the previously attached RAN node (if the third key is not removed and/or if any associated key index is not changed).

Figure 15:
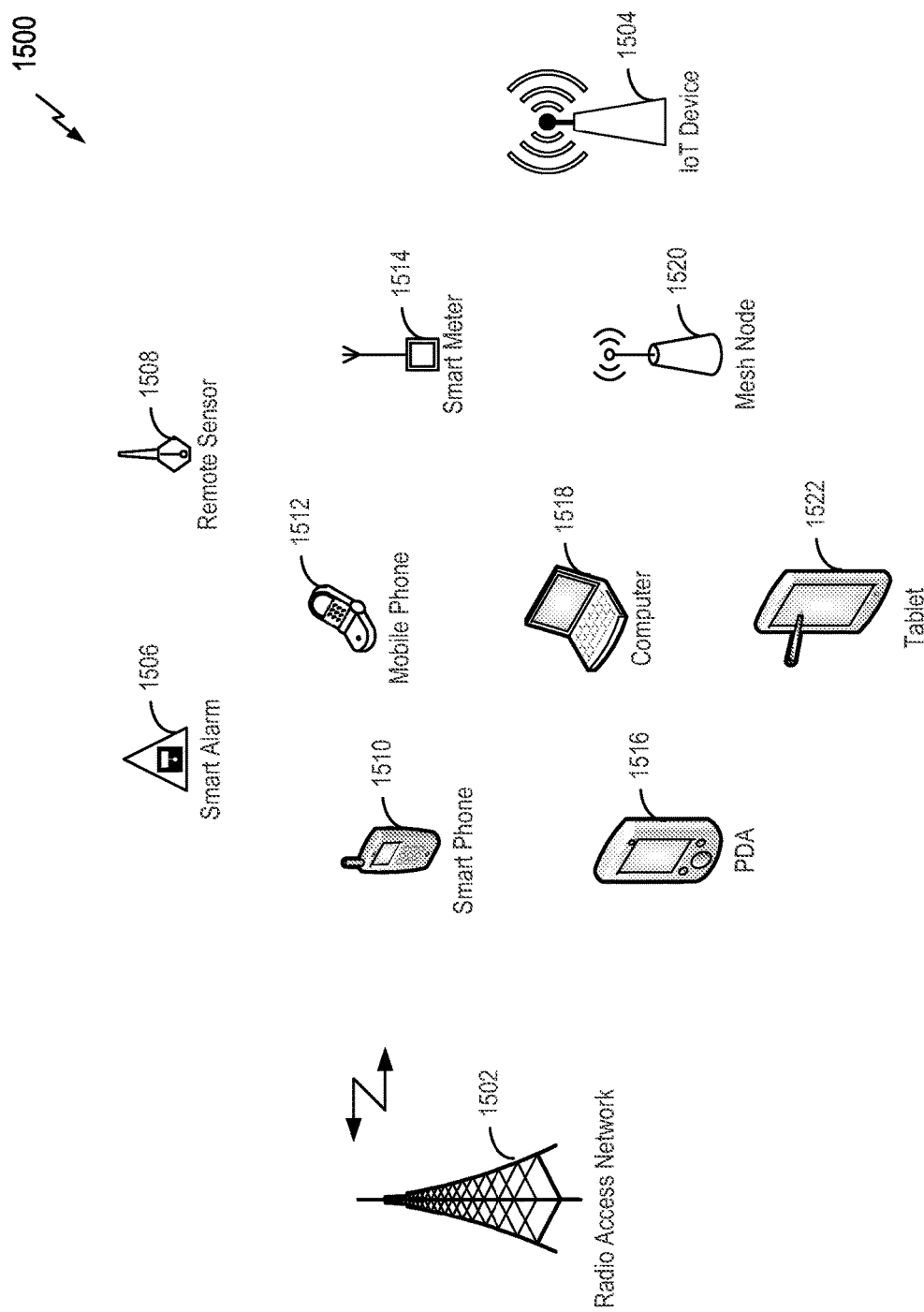
FIG. 15 is a schematic illustration of a wireless communication network including multiple communication entities as it may appear in some aspects of the disclosure.

FIG. 15 is a schematic illustration of a portion of a wireless communication network 1500 including a RAN 1502 and multiple communication entities as it may appear in some aspects of the disclosure. As described herein, a cellular device, a CIoT device, an LTE wireless cellular device, and/or a machine-type communications wireless cellular device may reside in, or be a part of, for example, an IoT device 1504, a smart alarm 1506, a remote sensor 1508, a smart phone 1510, a mobile phone 1512, a smart meter 1514, a personal digital assistant (PDA) 1516, a personal computer 1518, a mesh node 1520, and/or a tablet computer 1522. Of course, the illustrated devices or components are examples, and any suitable node or device may appear within a wireless communication network within the scope of the present disclosure. These examples are provided to illustrate certain concepts of the disclosure. Those of ordinary skill in the art will appreciate that these are exemplary in nature, and other examples may fall within the scope of the disclosure and the appended claims.

As those of ordinary skill in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTB-A) (in FDD, TDD, or both modes), CDMA 2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect mechanical and/or electrical coupling between two objects. For example, if object A physically touches and/or electrically communicates with object B, and object B physically touches and/or electrically communicates with object C, then objects A and C may still be considered coupled to one another even if they do not directly physically touch and/or electrically communicate with each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, blocks, features, and/or functions illustrated in above may be rearranged and/or combined into a single component, block, feature, or function or implemented in several components, blocks, features, and/or functions. Additional components, blocks, features, and/or functions may also be added without departing from novel features disclosed herein. The apparatus, devices, and/or components illustrated above may be adapted (e.g., constructed, configured, employed, implemented, and/or programmed) to perform one or more of the methods, blocks, features, and/or functions described herein. The algorithms described herein may also be efficiently implemented in software and/or embedded in hardware.

It is to be understood that the specific order or hierarchy of blocks in the methods disclosed is an illustration of exemplary processes. It is understood that the specific order or hierarchy of blocks in the methods may be rearranged. The accompanying method claims present elements of the various blocks in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus, comprising:
   a communication interface to communicate with a node of a communication network;
   a processing circuit coupled to the communication interface, the processing circuit adapted to:
   obtain a second key that is based on a first key and a parameter unique to the apparatus, wherein the first key is unknown to the apparatus and known to a gateway;
   obtain a small data message including a device identity and a first integrity protection value;
   obtain a third key that is based on the second key and the device identity;
   obtain a second integrity protection value that is based on the third key;
   compare the first integrity protection value to the second integrity protection value;
   discard the small data message if a comparison result indicates that the first integrity protection value is not equal to the second integrity protection value;
   send the small data message to the gateway if the comparison result indicates that the first integrity protection value is equal to the second integrity protection value; and
   wherein the first integrity protection value and the second integrity protection value are obtained using at least one nonce and/or a time stamp, and the processing circuit is further adapted to:
   provision a first nonce and/or the time stamp to a device identified by the device identity; and/or
   obtain a second nonce from the device.

2. The apparatus of claim 1, wherein the processing circuit is further adapted to: provision the first nonce and/or the time stamp and obtain the second nonce during a random access procedure.

3. The apparatus of claim 1, wherein the small data message is encrypted with the third key, and the processing circuit is further adapted to:
   decrypt the small data message using the third key.

4. The apparatus of claim 1, wherein the processing circuit is further adapted to:
   monitor a traffic load value;
   detect that the traffic load value exceeds a predetermined threshold value; and
   send a message, to a device that is identified by the device identity, that requests the device to include the first integrity protection value in a next one or more messages sent to the apparatus, in response to detecting that the traffic load value exceeds the predetermined threshold value.

5. The apparatus of claim 4, wherein a network configures the predetermined threshold value.

6. The apparatus of claim 1, wherein the processing circuit is further adapted to:
   obtain the second key from the gateway.

7. The apparatus of claim 6, wherein the gateway is Cellular Internet of Things serving gateway node (C-SGN).

8. The apparatus of claim 1, wherein the apparatus is a Cellular Internet of Things (CIoT) base station (C-BS) or an Evolved Node B (eNodeB), and wherein the parameter unique to apparatus is a C-BS Identity or an eNodeB Identity.

9. The apparatus of claim 1, wherein the processing circuit is further adapted to:
   obtain the first integrity protection value and the second integrity protection value using at least one nonce and/or a time stamp.

10. The apparatus of claim 1, wherein the processing circuit is further adapted to:
    negotiate an access stratum security configuration during an initial attach procedure with a device, wherein the access stratum security configuration specifies whether small data messages are sent from the device without security, with integrity protection, with encryption, with integrity protection and encryption, and/or with on-demand integrity protection, wherein integrity protection and encryption are performed using the third key.

11. An apparatus, comprising:
    a communication interface to communicate with a node of a communication network;
    a processing circuit coupled to the communication interface, the processing circuit adapted to:
    obtain a second key that is based on a first key and a parameter unique to the apparatus, wherein the first key is unknown to the apparatus and known to a gateway;
    obtain a small data message including a device identity and a first integrity protection value;
    obtain a third key that is based on the second key and the device identity;
    obtain a second integrity protection value that is based on the third key;
    compare the first integrity protection value to the second integrity protection value;
    discard the small data message if a comparison result indicates that the first integrity protection value is not equal to the second integrity protection value; and
    send the small data message to the gateway if the comparison result indicates that the first integrity protection value is equal to the second integrity protection value; and
    wherein the processing circuit is further adapted to:
    monitor a traffic load value;
    detect that the traffic load value exceeds a predetermined threshold value; and
    send a message, to a device that is identified by the device identity, that requests the device to include the first integrity protection value in a next one or more messages sent to the apparatus, in response to detecting that the traffic load value exceeds the predetermined threshold value.

12. The apparatus of claim 11, wherein the first integrity protection value and the second integrity protection value are obtained using at least one nonce and/or a time stamp, and the processing circuit is further adapted to:
    provision a first nonce and/or the time stamp to a device identified by the device identity; and/or
    obtain a second nonce from the device.

13. The apparatus of claim 12, wherein the processing circuit is further adapted to:
provision the first nonce and/or the time stamp and obtain the second nonce during a random access procedure.

14. The apparatus of claim 11, wherein the small data message is encrypted with the third key, and the processing circuit is further adapted to:
decrypt the small data message using the third key.

15. The apparatus of claim 11, wherein a network configures the predetermined threshold value.

16. The apparatus of claim 11, wherein the processing circuit is further adapted to:
obtain the second key from the gateway.

17. The apparatus of claim 16, wherein the gateway is Cellular Internet of Things serving gateway node (C-SGN).

18. The apparatus of claim 11, wherein the apparatus is a Cellular Internet of Things (CIoT) base station (C-BS) or an Evolved Node B (eNodeB), and wherein the parameter unique to apparatus is a C-BS Identity or an eNodeB Identity.

19. The apparatus of claim 11, wherein the processing circuit is further adapted to:
obtain the first integrity protection value and the second integrity protection value using at least one nonce and/or a time stamp.

20. The apparatus of claim 11, wherein the processing circuit is further adapted to:
negotiate an access stratum security configuration during an initial attach procedure with a device, wherein the access stratum security configuration specifies whether small data messages are sent from the device without security, with integrity protection, with encryption, with integrity protection and encryption, and/or with on-demand integrity protection, wherein integrity protection and encryption are performed using the third key.

21. A method of communication of an apparatus, comprising:
obtaining a second key that is based on a first key and a parameter unique to the apparatus, wherein the first key is unknown to the apparatus and known to a gateway;
obtaining a small data message including a device identity and a first integrity protection value;
obtaining a third key that is based on the second key and the device identity;
obtaining a second integrity protection value that is based on the third key;
comparing the first integrity protection value to the second integrity protection value;
discarding the small data message if a comparison result indicates that the first integrity protection value is not equal to the second integrity protection value;
sending the small data message to the gateway if the comparison result indicates that the first integrity protection value is equal to the second integrity protection value; and
wherein the first integrity protection value and the second integrity protection value are obtained using at least one nonce and/or a time stamp, and the method further comprises:
provisioning a first nonce and/or the time stamp to a device identified by the device identity; and/or
obtaining a second nonce from the device.

22. An apparatus, comprising:
means for obtaining a second key that is based on a first key and a parameter unique to the apparatus, wherein the first key is unknown to the apparatus and known to a gateway;
means for obtaining a small data message including a device identity and a first integrity protection value;
means for obtaining a third key that is based on the second key and the device identity;
means for obtaining a second integrity protection value that is based on the third key;
means for comparing the first integrity protection value to the second integrity protection value;
means for discarding the small data message if a comparison result indicates that the first integrity protection value is not equal to the second integrity protection value;
means for sending the small data message to the gateway if the comparison result indicates that the first integrity protection value is equal to the second integrity protection value; and
wherein the first integrity protection value and the second integrity protection value are obtained using at least one nonce and/or a time stamp, and the apparatus further comprises:
means for provisioning a first nonce and/or the time stamp to a device identified by the device identity; and/or
means for obtaining a second nonce from the device.

23. A non-transitory processor-readable medium storing processor-executable code, comprising code for causing a processor of an apparatus to:
obtain a second key that is based on a first key and a parameter unique to the apparatus, wherein the first key is unknown to the apparatus and known to a gateway;
obtain a small data message including a device identity and a first integrity protection value;
obtain a third key that is based on the second key and the device identity;
obtain a second integrity protection value that is based on the third key;
compare the first integrity protection value to the second integrity protection value;
discard the small data message if a comparison result indicates that the first integrity protection value is not equal to the second integrity protection value;
send the small data message to the gateway if the comparison result indicates that the first integrity protection value is equal to the second integrity protection value; and
wherein the first integrity protection value and the second integrity protection value are obtained using at least one nonce and/or a time stamp, and further comprising code for causing the processor of the apparatus to:
provision a first nonce and/or the time stamp to a device identified by the device identity; and/or
obtain a second nonce from the device.

24. A method of communication of an apparatus, comprising:
obtaining a second key that is based on a first key and a parameter unique to the apparatus, wherein the first key is unknown to the apparatus and known to a gateway;
obtaining a small data message including a device identity and a first integrity protection value;
obtaining a third key that is based on the second key and the device identity;
obtaining a second integrity protection value that is based on the third key;
comparing the first integrity protection value to the second integrity protection value;

discarding the small data message if a comparison result indicates that the first integrity protection value is not equal to the second integrity protection value;

sending the small data message to the gateway if the comparison result indicates that the first integrity protection value is equal to the second integrity protection value; and wherein the method further comprises:

monitoring a traffic load value;

detecting that the traffic load value exceeds a predetermined threshold value; and sending a message, to a device that is identified by the device identity, that requests the device to include the first integrity protection value in a next one or more messages sent to the apparatus, in response to detecting that the traffic load value exceeds the predetermined threshold value.

25. An apparatus, comprising:

means for obtaining a second key that is based on a first key and a parameter unique to the apparatus, wherein the first key is unknown to the apparatus and known to a gateway;

means for obtaining a small data message including a device identity and a first integrity protection value;

means for obtaining a third key that is based on the second key and the device identity;

means for obtaining a second integrity protection value that is based on the third key;

means for comparing the first integrity protection value to the second integrity protection value;

means for discarding the small data message if a comparison result indicates that the first integrity protection value is not equal to the second integrity protection value;

means for sending the small data message to the gateway if the comparison result indicates that the first integrity protection value is equal to the second integrity protection value; and wherein the apparatus further comprises:

means for monitoring a traffic load value;

means for detecting that the traffic load value exceeds a predetermined threshold value; and means for sending a message, to a device that is identified by the device identity, that requests the device to include the first integrity protection value in a next one or more messages sent to the apparatus, in response to detecting that the traffic load value exceeds the predetermined threshold value.

26. A non-transitory processor-readable medium storing processor-executable code, comprising code for causing a processor of an apparatus to:

obtain a second key that is based on a first key and a parameter unique to the apparatus, wherein the first key is unknown to the apparatus and known to a gateway;

obtain a small data message including a device identity and a first integrity protection value;

obtain a third key that is based on the second key and the device identity;

obtain a second integrity protection value that is based on the third key;

compare the first integrity protection value to the second integrity protection value;

discard the small data message if a comparison result indicates that the first integrity protection value is not equal to the second integrity protection value;

send the small data message to the gateway if the comparison result indicates that the first integrity protection value is equal to the second integrity protection value; and wherein the non-transitory processor-readable medium storing processor-executable code, further comprises code for causing the processor of the apparatus to:

monitor a traffic load value;

detect that the traffic load value exceeds a predetermined threshold value; and send a message, to a device that is identified by the device identity, that requests the device to include the first integrity protection value in a next one or more messages sent to the apparatus, in response to detecting that the traffic load value exceeds the predetermined threshold value.

* * * * *